United States Patent
Hormis et al.

(10) Patent No.: US 11,792,063 B2
(45) Date of Patent: Oct. 17, 2023

(54) TECHNIQUES FOR PHASE ROTATION CORRECTION

(71) Applicant: QUALCOMM Incorporated, San Diego, CA (US)

(72) Inventors: Raju Hormis, New York, NY (US); Junyi Li, Chester, NJ (US); Navid Abedini, Somerset, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/857,008

(22) Filed: Apr. 23, 2020

(65) Prior Publication Data

US 2020/0366544 A1 Nov. 19, 2020

Related U.S. Application Data

(60) Provisional application No. 62/847,878, filed on May 14, 2019.

(51) Int. Cl.
*H04L 27/26* (2006.01)
*H04L 27/38* (2006.01)
(Continued)

(52) U.S. Cl.
CPC ......... *H04L 27/2657* (2013.01); *H04B 7/155* (2013.01); *H04L 1/08* (2013.01);
(Continued)

(58) Field of Classification Search
None
See application file for complete search history.

(56) References Cited

U.S. PATENT DOCUMENTS

| | | |
|---|---|---|
| 4,701,935 A | 10/1987 | Namiki |
| 6,615,021 B1 | 9/2003 | Lovinggood et al. |

(Continued)

FOREIGN PATENT DOCUMENTS

| | | |
|---|---|---|
| CN | 101771656 A | 7/2010 |
| EP | 2141875 A1 | 1/2010 |
| EP | 2290851 A2 | 3/2011 |

OTHER PUBLICATIONS

International Search Report and Written Opinion—PCT/US2020/029916—ISA/EPO—dated Jul. 23, 2020.
(Continued)

*Primary Examiner* — Rebecca E Song
(74) *Attorney, Agent, or Firm* — Holland & Hart LLP / QUALCOMM Incorporated

(57) ABSTRACT

Methods, systems, and devices for wireless communications are described. A phase rotation adjustment may be applied in cases where a transmitted signal is heterodyned. For instance, a device (e.g., a base station, a user equipment (UE), a wireless repeater) may determine that a receiving device may receive a transmitted signal at a carrier frequency that is different from a carrier frequency used by a transmitting device (e.g., such as in the case of a wireless repeater relaying the signal from the transmitting device to the receiving device). A phase rotation adjustment may be applied by the device (e.g., the base station, UE, or wireless repeater) to account for the heterodyning. The phase rotation adjustment may be based on the carrier frequency used by the receiving device to receive the signal. In some cases, a receiving device may also apply the phase rotation adjustment following the demodulation of a received signal.

80 Claims, 19 Drawing Sheets

(51) Int. Cl.
*H04L 1/08* (2006.01)
*H04W 72/0453* (2023.01)
*H04B 7/155* (2006.01)

(52) U.S. Cl.
CPC ..... *H04L 27/3872* (2013.01); *H04W 72/0453* (2013.01); *H04L 27/2626* (2013.01)

(56) References Cited

U.S. PATENT DOCUMENTS

| | | | |
|---|---|---|---|
| 8,095,067 | B2 | 1/2012 | Gainey et al. |
| 8,514,970 | B2 | 8/2013 | Imamura et al. |
| 8,638,867 | B2 | 1/2014 | Roman et al. |
| 10,608,678 | B1 | 3/2020 | Hormis et al. |
| 11,101,842 | B2 | 8/2021 | Hormis et al. |
| 2005/0141408 | A1* | 6/2005 | Anvari ............... H04L 27/2621 370/206 |
| 2005/0190821 | A1* | 9/2005 | Fujii .................. H04B 7/2606 375/211 |
| 2011/0158156 | A1* | 6/2011 | Ma .................... H04L 5/14 370/315 |
| 2012/0243646 | A1 | 9/2012 | Horikawa et al. |
| 2013/0083828 | A1* | 4/2013 | Rofougaran ....... H04B 7/15542 375/211 |
| 2015/0010104 | A1* | 1/2015 | Park .................. H04L 27/2627 375/295 |
| 2016/0269219 | A1* | 9/2016 | Wang ................ H04L 27/3872 |
| 2017/0347338 | A1* | 11/2017 | Chen ................ H04W 72/005 |
| 2019/0043388 | A1* | 2/2019 | Li ..................... H04W 12/04 |
| 2020/0195310 | A1 | 6/2020 | Abedini et al. |
| 2020/0280127 | A1 | 9/2020 | Hormis et al. |
| 2020/0280355 | A1 | 9/2020 | Abedini et al. |
| 2020/0280365 | A1 | 9/2020 | Abedini et al. |
| 2020/0280887 | A1 | 9/2020 | Abedini et al. |
| 2020/0295914 | A1 | 9/2020 | Hormis et al. |
| 2020/0314601 | A1 | 10/2020 | Hormis et al. |
| 2020/0322037 | A1 | 10/2020 | Abedini et al. |
| 2020/0382200 | A1 | 12/2020 | Hormis et al. |
| 2020/0382208 | A1 | 12/2020 | Hormis et al. |
| 2021/0036764 | A1 | 2/2021 | Li et al. |
| 2021/0037457 | A1 | 2/2021 | Li et al. |
| 2021/0037459 | A1 | 2/2021 | Li et al. |
| 2021/0037460 | A1 | 2/2021 | Li et al. |
| 2021/0037574 | A1 | 2/2021 | Li et al. |
| 2021/0044412 | A1 | 2/2021 | Li et al. |
| 2022/0085951 | A1* | 3/2022 | Lee .................... H04L 1/18 |

OTHER PUBLICATIONS

3GPP TS 38.211 v15.5.0 (Mar. 2019), 3rd Generation Partnership Project; Technical Specification Group Radio Access Network; NR; Physical channels and modulation (Release 15), 2019, 3GPP Organizational Partners, Valbonne, France, 96 pages.

3GPP TS 38.101-1 V15.5.0 (Mar. 2019), 3rd Generation Partnership Project; Technical Specification Group Radio Access Network; NR; User Equipment (UE) radio transmission and reception; Part 1: Range 1 Standalone (Release 15), 2019, 3GPP Organizational Partners, Valbonne, France, 239 pages.

* cited by examiner

TECHNIQUES FOR PHASE ROTATION CORRECTION

CROSS REFERENCE

The present Application for Patent claims the benefit of U.S. Provisional Patent Application No. 62/847,878 by Hormis et al., entitled "TECHNIQUES FOR PHASE ROTATION CORRECTION," filed May 14, 2019, assigned to the assignee hereof, and expressly incorporated by reference in its entirety herein.

FIELD OF TECHNOLOGY

The following relates generally to wireless communications and more specifically to techniques for phase rotation correction.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a first device in a wireless network is described. The method may include transmitting an indication to a second device that indicates a first carrier frequency for receiving a signal. In some examples, the method may include identifying, based on the indication, a phase rotation adjustment for the signal, the phase rotation adjustment corresponding to a second carrier frequency that is different from the first carrier frequency. In some examples, the method may include applying, by the first device, the phase rotation adjustment to the signal. In some cases, the method may include transmitting, to the second device, the signal including the applied phase rotation adjustment.

An apparatus for wireless communications at a first device in a wireless network is described. The apparatus may include a processor and memory coupled to the processor, and the processor and memory may be configured to transmit an indication to a second device that indicates a first carrier frequency for receiving a signal. In some examples, the processor and memory may be configured to identify, based on the indication, a phase rotation adjustment for the signal, the phase rotation adjustment corresponding to a second carrier frequency that is different from the first carrier frequency. In some examples, the processor and memory may be configured to apply, by the first device, the phase rotation adjustment to the signal. In some cases, the instructions may be executable by the processor to transmit, to the second device, the signal including the applied phase rotation adjustment.

Another apparatus for wireless communications at a first device in a wireless network is described. The apparatus may include means for transmitting an indication to a second device that indicates a first carrier frequency for receiving a signal. In some examples, the apparatus may include means for identifying, based on the indication, a phase rotation adjustment for the signal, the phase rotation adjustment corresponding to a second carrier frequency that is different from the first carrier frequency. In some examples, the apparatus may include means for applying, by the first device, the phase rotation adjustment to the signal. In some examples, the apparatus may include means for transmitting, to the second device, the signal including the applied phase rotation adjustment.

A non-transitory computer-readable medium storing code for wireless communications at a first device in a wireless network is described. The code may include instructions executable by a processor to transmit an indication to a second device that indicates a first carrier frequency for receiving a signal. In some examples, the code may include instructions executable by the processor to identify, based on the determination, a phase rotation adjustment for the signal, the phase rotation adjustment corresponding to a second carrier frequency that is different from the first carrier frequency. In some examples, the code may include instructions executable by the processor to apply, by the first device, the phase rotation adjustment to the signal. In some examples, the code may include instructions executable by the processor to transmit, to the second device, the signal including the applied phase rotation adjustment.

Some examples of the method, apparatuses, and non-transitory computer-readable medium described herein may further include operations, features, means, or instructions for determining a configuration of a wireless repeater that may be between the first device and the second device, where the phase rotation adjustment may be based on the configuration of the wireless repeater.

In some examples of the method, apparatuses, and non-transitory computer-readable medium described herein, the configuration of the wireless repeater includes a frequency translation from the first carrier frequency to the second carrier frequency, and where the phase rotation adjustment may be applied based on the frequency translation.

In some examples of the method, apparatuses, and non-transitory computer-readable medium described herein, identifying the phase rotation adjustment may include operations, features, means, or instructions for selecting the phase rotation adjustment from one or more phase rotation adjustments for a set of carrier frequencies that may be different from the first carrier frequency, each carrier frequency of the set corresponding to a respective phase rotation adjustment.

Some examples of the method, apparatuses, and non-transitory computer-readable medium described herein may further include operations, features, means, or instructions for identifying the one or more phase rotation adjustment using a phase rotation adjustment table.

In some examples of the method, apparatuses, and non-transitory computer-readable medium described herein, applying the phase rotation adjustment may include operations, features, means, or instructions for applying the phase rotation adjustment to the signal based on respective indexes of one or more symbol periods, where the phase rotation adjustment applied to the signal for transmission during the one or more symbol periods may be calculated based on the respective indexes.

Some examples of the method, apparatuses, and non-transitory computer-readable medium described herein may further include operations, features, means, or instructions for determining that a transmission of a second signal at the first carrier frequency will be received by a third device at a third carrier frequency that may be different from the first carrier frequency, identifying a second phase rotation adjustment for the second signal, the second phase rotation adjustment corresponding to the third carrier frequency, applying the second phase rotation adjustment to the second signal, and transmitting, to the third device, the second signal including the applied second phase rotation adjustment.

Some examples of the method, apparatuses, and non-transitory computer-readable medium described herein may further include operations, features, means, or instructions for applying the phase rotation adjustment to the signal and the second phase rotation adjustment to the second signal for a same symbol period.

Some examples of the method, apparatuses, and non-transitory computer-readable medium described herein may further include operations, features, means, or instructions for identifying one or more resource blocks allocated to the second device, where the phase rotation adjustment may be applied to the identified one or more resource blocks.

In some examples of the method, apparatuses, and non-transitory computer-readable medium described herein, applying the phase rotation adjustment may include operations, features, means, or instructions for applying the phase rotation adjustment to the signal prior to a transformation of the signal from a frequency-domain signal to a time-domain signal.

In some examples of the method, apparatuses, and non-transitory computer-readable medium described herein, the phase rotation adjustment is determined in accordance with an equation including $e^{-j2\pi f_n(t_{start,l}^{\mu}+N_{CP,l}^{\mu}T^c)}$. In some examples of the method, apparatuses, and non-transitory computer-readable medium described herein, $t_{start,l}^{\mu}$ includes a starting position of a symbol l for a subcarrier spacing configuration in a subframe, $N_{CP,l}^{\mu}$ includes a cyclic prefix length in samples for the symbol l, and $T_c$ includes a sampling interval in a baseband.

A method of wireless communications at a first device in a wireless network is described. The method may include receiving, from a second device, a configuration of a phase rotation. In some examples, the method may include receiving, from the second device, a signal on a first carrier frequency. In some examples, the method may include applying a phase rotation adjustment to the signal based on the configuration. In some examples, the method may include retransmitting, to a third device, the signal including the applied phase rotation adjustment, the signal being retransmitted at a second carrier frequency.

An apparatus for wireless communications at a first device in a wireless network is described. The apparatus may include a processor and memory coupled to the processor, and the processor and memory may be configured to receive, from a second device, a configuration of a phase rotation. In some examples, the processor and memory may be configured to receive, from the second device, a signal on a first carrier frequency. In some examples, the processor and memory may be configured to apply a phase rotation adjustment to the signal based on the configuration. In some examples, the processor and memory may be configured to retransmit, to a third device, the signal including the applied phase rotation adjustment, the signal being retransmitted at a second carrier frequency.

Another apparatus for wireless communications at a first device in a wireless network is described. The apparatus may include means for receiving, from a second device, a configuration of a phase rotation. In some examples, the apparatus may include means for receiving, from the second device, a signal on a first carrier frequency. In some examples, the apparatus may include means for applying a phase rotation adjustment to the signal based on the configuration. In some examples, the apparatus may include means for retransmitting, to a third device, the signal including the applied phase rotation adjustment, the signal being retransmitted at a second carrier frequency.

A non-transitory computer-readable medium storing code for wireless communications at a first device in a wireless network is described. The code may include instructions executable by a processor to receive, from a second device, a configuration of a phase rotation. In some examples, the code may include instructions executable by the processor to receive, from the second device, a signal on a first carrier frequency. In some examples, the code may include instructions executable by the processor to apply a phase rotation adjustment to the signal based on the configuration. In some examples, the code may include instructions executable by the processor to retransmit, to a third device, the signal including the applied phase rotation adjustment, the signal being retransmitted at a second carrier frequency.

In some examples of the method, apparatuses, and non-transitory computer-readable medium described herein, applying the phase rotation adjustment to the signal may include operations, features, means, or instructions for applying the phase rotation adjustment to the signal based on respective indexes of one or more symbol periods, where the phase rotation adjustment applied to the signal received during the one or more symbol periods may be calculated based on the respective indexes.

Some examples of the method, apparatuses, and non-transitory computer-readable medium described herein may further include operations, features, means, or instructions for identifying the phase rotation adjustment from a phase rotation adjustment table including a set of carrier frequencies that may be different from the first carrier frequency, each carrier frequency of the set corresponding to a respective phase rotation adjustment.

In some examples of the method, apparatuses, and non-transitory computer-readable medium described herein, applying the phase rotation adjustment to the signal may include operations, features, means, or instructions for applying the phase rotation adjustment to the signal based on respective indexes of one or more symbol periods, where the phase rotation adjustment applied to the signal received during the one or more symbol periods may be calculated based on the respective indexes.

Some examples of the method, apparatuses, and non-transitory computer-readable medium described herein may further include operations, features, means, or instructions for determining the phase rotation adjustment in accordance with an equation including $e^{-j2\pi f_n(t_{start,l}^{\mu}+N_{CP,l}^{\mu}T^c)}$. In some examples of the method, apparatuses, and non-transitory computer-readable medium described herein, $t_{start,l}^{\mu}$ includes a starting position of a symbol l for a subcarrier spacing configuration $\mu$ in a subframe, $N_{CP,l}^{\mu}$ includes a cyclic prefix length in samples for the symbol l, and $T_c$ includes a sampling interval in a baseband.

In some examples of the method, apparatuses, and non-transitory computer-readable medium described herein, the first carrier frequency may be different from the second carrier frequency.

In some examples of the method, apparatuses, and non-transitory computer-readable medium described herein, the first device may be a wireless repeater.

In some examples of the method, apparatuses, and non-transitory computer-readable medium described herein, the second device may be a base station or a UE, and where the third device may be a base station or a UE.

A method of wireless communications at a UE is described. The method may include receiving an indication that a signal is to be transmitted by a base station at a first carrier frequency. In some examples, the method may include receiving, by the UE, the signal on a second carrier frequency that is different from the first carrier frequency. In some examples, the method may include applying a phase rotation adjustment to the received signal based on receiving the signal on the second carrier frequency, the phase rotation adjustment corresponding to the first carrier frequency.

An apparatus for wireless communications at a UE is described. The apparatus may include a processor and memory coupled to the processor, and the processor and memory may be configured to receive an indication that a signal is to be transmitted by a base station at a first carrier frequency. In some examples, the processor and memory may be configured to receive, by the UE, a signal on a second carrier frequency that is different from the first carrier frequency. In some examples, the processor and memory may be configured to apply a phase rotation adjustment to the received signal based on receiving the signal on the second carrier frequency, the phase rotation adjustment corresponding to the first carrier frequency.

Another apparatus for wireless communications at a UE is described. The apparatus may include means for receiving an indication that a signal is to be transmitted by a base station at a first carrier frequency. In some examples, the apparatus may include means for receiving, by the UE, the signal on a second carrier frequency that is different from the first carrier frequency. In some examples, the apparatus may include means for applying a phase rotation adjustment to the received signal based on receiving the signal on the second carrier frequency, the phase rotation adjustment corresponding to the first carrier frequency.

A non-transitory computer-readable medium storing code for wireless communications at a UE is described. The code may include instructions executable by a processor to receive an indication that a signal is to be transmitted by a base station at a first carrier frequency. In some examples, the code may include instructions executable by the processor to receive, by the UE, the signal on a second carrier frequency that is different from the first carrier frequency. In some examples, the code may include instructions executable by the processor to apply a phase rotation adjustment to the received signal based on receiving the signal on the second carrier frequency, the phase rotation adjustment corresponding to the first carrier frequency.

In some examples of the method, apparatuses, and non-transitory computer-readable medium described herein, receiving the signal from the base station may include operations, features, means, or instructions for receiving the signal from the base station via a wireless repeater operating at the second carrier frequency.

Some examples of the method, apparatuses, and non-transitory computer-readable medium described herein may further include operations, features, means, or instructions for identifying the phase rotation adjustment from a phase rotation adjustment table including a set of carrier frequencies that may be different from the first carrier frequency, each carrier frequency of the set corresponding to a respective phase rotation adjustment.

In some examples of the method, apparatuses, and non-transitory computer-readable medium described herein, applying the phase rotation adjustment to the signal may include operations, features, means, or instructions for applying the phase rotation adjustment to the signal based on respective indexes of one or more symbol periods, where the phase rotation adjustment applied to the signal received during the one or more symbol periods may be calculated based on the respective indexes.

Some examples of the method, apparatuses, and non-transitory computer-readable medium described herein may further include operations, features, means, or instructions for demodulating the signal, and transforming the demodulated signal from a time-domain signal to a frequency-domain signal, where the phase rotation adjustment may be applied after the transformation.

A method of wireless communications at a base station is described. The method may include transmitting an indication to a UE that indicates a first carrier frequency for transmitting a signal. In some examples, the method may include receiving, from the UE, the signal on a second carrier frequency that is different from the first carrier frequency. In some examples, the method may include applying a phase rotation adjustment to the signal based on receiving the signal at the second carrier frequency, the phase rotation adjustment corresponding to the second carrier frequency.

An apparatus for wireless communications at a base station is described. The apparatus may include a processor and memory coupled to the processor, and the processor and memory may be configured to transmit an indication to a UE that indicates a first carrier frequency for transmitting a signal. In some examples, the processor and memory may be configured to receive, from the UE, the signal on a second carrier frequency that is different from the first carrier frequency. In some examples, the processor and memory may be configured to apply a phase rotation adjustment to the signal based on receiving the signal at the second carrier frequency, the phase rotation adjustment corresponding to the second carrier frequency.

Another apparatus for wireless communications at a base station is described. The apparatus may include means for transmitting an indication to a UE that indicates a first carrier frequency for transmitting a signal. In some examples, the apparatus may include means for receiving, from the UE, the signal on a second carrier frequency that is different from the first carrier frequency. In some examples, the apparatus may include means for applying a phase rotation adjustment to the signal based on receiving the signal at the second carrier frequency, the phase rotation adjustment corresponding to the second carrier frequency.

A non-transitory computer-readable medium storing code for wireless communications at a base station is described. The code may include instructions executable by a processor to transmit an indication to a UE that indicates a first carrier frequency for transmitting a signal. In some examples, the code may include instructions executable by a processor to receive, from the UE, the signal on a second carrier frequency that is different from the first carrier frequency. In some examples, the code may include instructions executable by a processor to apply a phase rotation adjustment to the signal based on receiving the signal at the second carrier frequency, the phase rotation adjustment corresponding to the second carrier frequency.

In some examples of the method, apparatuses, and non-transitory computer-readable medium described herein, receiving the signal from the UE may include operations, features, means, or instructions for receiving the signal from the UE via a wireless repeater operating at the second carrier frequency.

Some examples of the method, apparatuses, and non-transitory computer-readable medium described herein may further include operations, features, means, or instructions for determining a configuration of the wireless repeater, where the phase rotation adjustment may be based on the configuration of the wireless repeater.

In some examples of the method, apparatuses, and non-transitory computer-readable medium described herein, the configuration of the wireless repeater includes a frequency translation from the first carrier frequency to the second carrier frequency, and where the phase rotation adjustment may be applied based on the frequency translation.

Some examples of the method, apparatuses, and non-transitory computer-readable medium described herein may further include operations, features, means, or instructions for identifying the phase rotation adjustment from a phase rotation adjustment table including a set of carrier frequencies that may be different from the first carrier frequency, each carrier frequency of the set corresponding to a respective phase rotation adjustment.

Some examples of the method, apparatuses, and non-transitory computer-readable medium described herein may further include operations, features, means, or instructions for demodulating the signal, and transforming the demodulated signal from a time-domain signal to a frequency-domain signal, where the phase rotation adjustment may be applied after the transformation.

DETAILED DESCRIPTION

Figure 1:
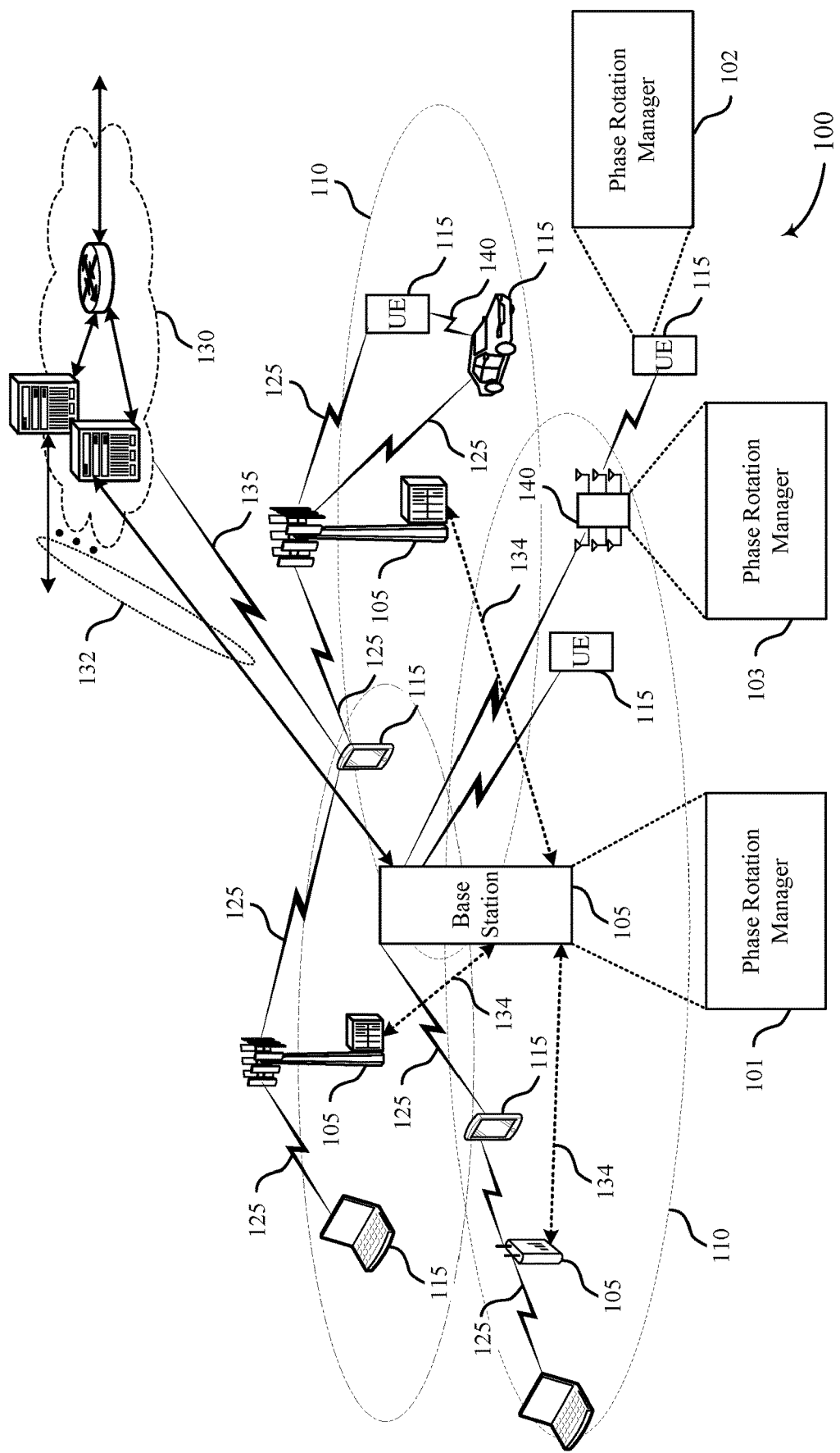
FIG. 1 illustrates an example of a system for wireless communications that supports techniques for phase rotation correction in accordance with one or more aspects of the present disclosure.

In a wireless communications system, a base station may communicate with a UE over a wireless link. For instance, base stations and UEs may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and reduce the pathlosses at these frequencies. However, the transmission of a signal (such as a beamformed signal) between the base station and the UE may not be possible or may be interfered with due to a physical barrier or a radio frequency (RF) jammer. In these cases, a wireless repeater may be used to repeat or relay the transmission from the base station to the UE, and vice versa, thereby enabling efficient communication in the presence of RF jammers.

In some cases, signals transmitted by wireless devices may include a phase rotation that is applied during modulation and coding by the transmitting device. For instance, a base station may transmit a signal on a particular carrier frequency and with a phase rotation (e.g., a pre-rotation) based on the carrier frequency. The phase rotation may be applied to a set of tones of a signal before transforming the signal from the frequency domain to the time domain. In some cases, the base station may apply the same phase pre-rotation to all symbols and tones within a signal regardless of which UE the signal will be transmitted to (and regardless of what frequency the signal will be received on at a respective UE). Thus, in some cases, a same phase rotation may be applied to all signals transmitted from the base station to multiple UEs.

In cases where transmissions from the base station to the UE (and vice versa) are blocked due to an RF jammer, the RF jammer may corrupt some frequencies, and those frequencies (such as the frequency used for transmission by the base station) may therefore not be reliable for transmission to the UE. As such, a wireless repeater may be used to transmit (or retransmit) the signal after amplifying the signal and translating (e.g., heterodyning) a first carrier frequency to a second carrier frequency. The second frequency may be different from the frequency that was used to transmit the signal to the repeater, and may be unaffected by interference from the RF jammer. However, heterodyning the signal may also affect the phase rotation associated with the signal. For instance, the phase rotation may be predefined (e.g., in accordance with a wireless communications standard) and based on a frequency on which the signal is transmitted. Therefore, heterodyning the carrier frequency may shift the carrier frequency that is used for retransmission of a signal, thereby causing an error in phase rotation for a signal received at a receiving device. The error in phase rotation may, for example, cause the transmission waveform to be dependent on the size of a fast-Fourier transform (FFT) size and a location of an RF local oscillator (LO). As such, an additional phase rotation or phase rotation correction may be used to account for the frequency translation of the heterodyned signal.

As described herein, to avoid or correct an error in phase rotation causing dependencies of the waveforms, the base station may apply a phase rotation adjustment to the symbols of the signal before transforming the signal from frequency domain to time domain, which may be based on the carrier frequency used by a respective UE to receive the signal (e.g., after retransmission by a wireless repeater). The phase rotation correction may be unique to each symbol, and may depend on the frequency into which the repeater for the corresponding UE will heterodyne the received frequency. In various aspects, a base station or UE may determine a carrier frequency that another device will receive a transmitted signal at (e.g., post repeater), and may adjust a phase rotation based on the carrier frequency prior to transmission. In some cases, a receiving device may receive a signal from a repeater and apply the phase rotation correction to the signal after it has been received and before it is transformed from the time domain to the frequency domain by the receiving device.

In other cases, a UE in a wireless communication system may apply a phase rotation correction after receiving the signal from the repeater based on a determination that the signal was transmitted on a different frequency than it was received on. In still other cases, a base station may apply a phase rotation correction to an uplink communication from a UE based on determining that the signal was received by the base station on a different frequency than the frequency used by the UE to transmit the signal.

Additionally or alternatively, a repeater may apply the phase rotation adjustment when relaying or retransmitting a signal between other devices. In such cases, the repeater may receive a configuration (e.g., from a base station) that enables the repeater to apply the phase rotation to a signal, for example, before the signal to transmitted to another device and based on the carrier frequencies used for transmission of the signal between the devices. As an example, the repeater may receive a signal from a base station on a first carrier frequency, and the repeater may apply a phase rotation correction to the signal based on a phase rotation configuration. The repeater may then transmit the signal including the phase rotation correction to a UE on a second carrier frequency.

Aspects of the disclosure are initially described in the context of a wireless communications system. Aspects of the disclosure are then described further in relation to other wireless communication systems and process flow diagrams that support techniques for phase rotation correction. Aspects of the disclosure are further illustrated by and described with reference to apparatus diagrams, system diagrams, and flowcharts that relate to techniques for phase rotation correction.

FIG. 1 illustrates an example of a wireless communications system 100 that supports techniques for phase rotation correction in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some examples, base station 105 may wirelessly communicate with one or more repeaters 140 (e.g., repeating devices, wireless repeaters, mmW repeaters, or similar terminology) that may support the retransmission, amplification, frequency translation, etc. of signaling to one or more other devices, such as a UE 115. Similarly, a repeater may be used to retransmit signaling from a UE 115 to a base station 105.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a repeater 140 may be a MTC or IoT device that is controlled by a base station 105 or UE 115 via, for example, a low-band or NB-IoT connection and performs repeating of received signals without demodulation or decoding of such signals based on received control information (e.g., provided by the low-band or NB-IoT connection).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). In some examples, a UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception, or both, by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include one or more repeaters 140 (e.g., wireless repeaters 140). Repeaters 140 may include functionality to repeat, extend, and redirect wireless signals transmitted within a wireless communications system. A repeater 140 may be an example of an analog repeater or a digital repeater, or any combination thereof (e.g., a digitally-assisted analog repeater). In some cases, wireless repeaters 140 may be used in line-of-sight (LOS) or non-line of sight (NLOS) scenarios. In a LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater 140 may be used to receive a signal from a base station 105 and transmit a signal to UE 115, or receive a signal from a UE 115 and transmit the signal to the base station 105. Beamforming, filtering, gain control, and frequency translation techniques may be utilized by the wireless repeater 140 to improve signal quality and avoid RF interference with the transmitted signal. In some examples, a phase rotation adjustment may be applied by a wireless repeater 140 to correct for a phase rotation error caused by the frequency translation. Additionally or alternatively, as described herein, phase rotation correction techniques may be performed by a UE 115, a base station 105, or both, when a repeater 140 translates the carrier frequency of a signal.

Thus, wireless communications system 100 may support phase rotation adjustments in cases where a transmitted signal is heterodyned to a different frequency after transmission. For instance, a transmitting device in wireless communications system 100 (e.g., a base station 105 or UE 115) may, prior to transmitting, determine that a receiving device (e.g., another base station 105 or another UE 115) may receive a transmitted signal at a carrier frequency that is different from a carrier frequency used by the transmitting device (e.g., such as in the case of a wireless repeater 140 relaying the transmission to the receiving device). As such, the transmitting device may apply a phase rotation adjustment to account for the heterodyning of the signal, where the phase rotation may be based on the carrier frequency used by the receiving device to receive the signal. In some cases, a receiving device may also apply the phase rotation adjustment following the demodulation of a received signal. Additionally or alternatively, a repeater 140 may both heterodyne a received signal and apply a phase rotation correction or adjustment to the received signal. The repeater 140 may then retransmit the heterodyned signal having the applied phase rotation correction.

Some examples of wireless communications system 100 may support communications between UEs 115 and base stations 105. One or more base stations 105 may include phase rotation managers 101, and one or more UEs 115 may also include phase rotation managers 102. Phase rotation managers 101 and 102 may manage phase rotation corrections either by a UE 115 or by a base station 105. In some examples, a repeater 140 may include a phase rotation manager 103.

For base station 105, the phase rotation manager 101 may determine that a transmission of a signal at a first carrier frequency will be received by a second device at a second carrier frequency that is different from the first carrier frequency, identify, based on the determination, a phase rotation adjustment for the signal, the phase rotation adjustment corresponding to the second carrier frequency, apply the phase rotation adjustment to the signal, and transmit, to the second device, the signal including the applied phase rotation adjustment.

In other cases, for base station 105, the phase rotation manager 101 may receive, from a UE 115, a signal of a first carrier frequency, determine that the signal was transmitted by the UE 115 at a second carrier frequency that is different from the first carrier frequency, and apply a phase rotation adjustment to the signal based on the determination, the phase rotation adjustment corresponding to the second carrier frequency.

UEs 115 may include phase rotation manager 102, which may receive, from a base station 105, a signal on a first carrier frequency, determine that the signal was transmitted by the base station 105 on a second carrier frequency that is different from the first carrier frequency, and apply a phase rotation adjustment to the signal based on the determination, the phase rotation adjustment corresponding to the first carrier frequency. In some examples, phase rotation manager 102 may determine that a transmission of a signal at a first carrier frequency will be received by a second device at a second carrier frequency that is different from the first carrier frequency, identify, based on the determination, a phase rotation adjustment for the signal, the phase rotation adjustment corresponding to the second carrier frequency, apply the phase rotation adjustment to the signal, and transmit, to the second device, the signal including the applied phase rotation adjustment.

For a repeater 140, the phase rotation manager 103 may receive, from a UE 115 or base station 105, a configuration of a phase rotation. The phase rotation manager 102 may receive, from the UE 115 or the base station 105, a signal on a first carrier frequency. In some examples, the phase rotation manager 103 may apply a phase rotation adjustment to the signal based on the configuration and retransmit, to a UE 115 or a base station 105, the signal including the applied phase rotation adjustment, the signal being retransmitted at a second carrier frequency that is different from the first carrier frequency.

Figure 2:
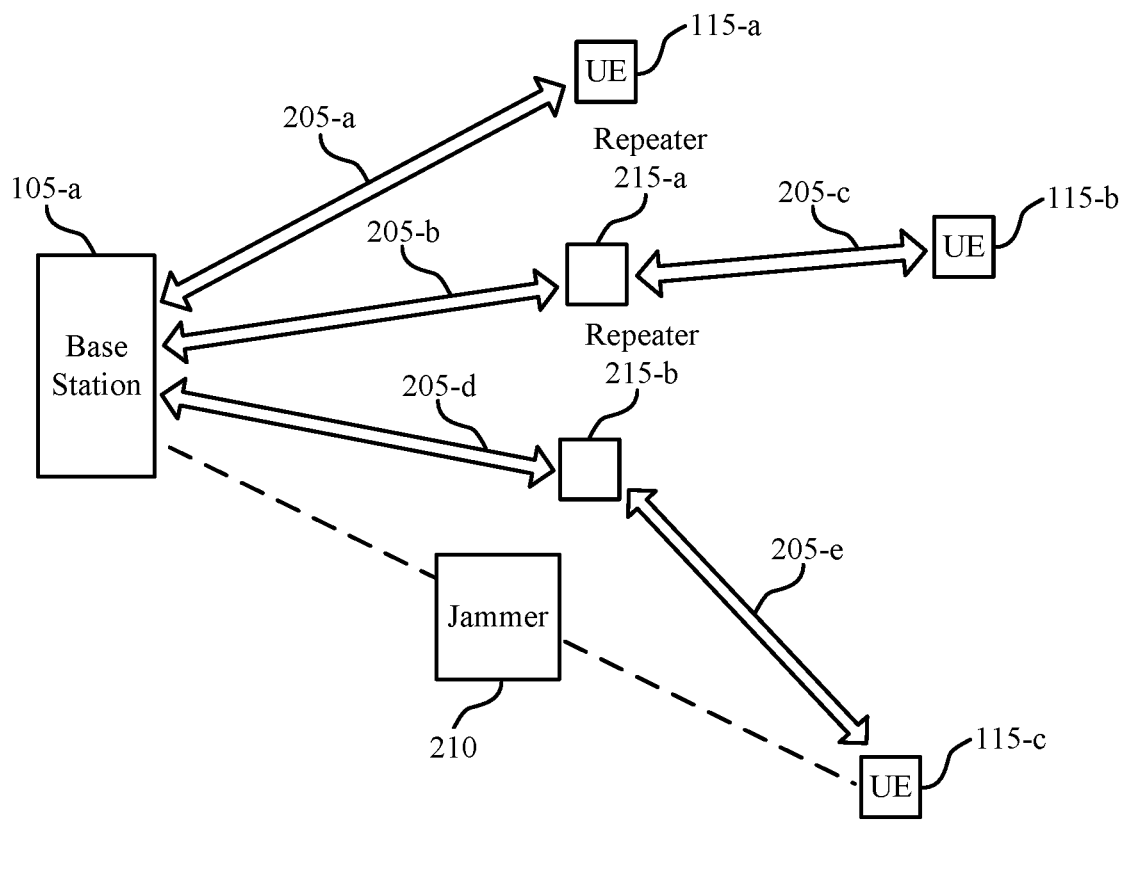
FIG. 2 illustrates an example of a system for wireless communications that supports techniques for phase rotation correction in accordance with one or more aspects of the present disclosure.

FIG. 2 illustrates an example of a wireless communications system 200 that supports techniques for phase rotation correction in accordance with one or more aspects of the present disclosure. The wireless communications system 200 may include a base station 105-a and UEs 115-a, 115-b, and 115-c, which may be examples of a base station 105 and UEs 115 as described with reference to FIG. 1. Base station 105-a may communicate with UEs 115 by transmitting signals 205. In some cases, signals 205 may be relayed from base station 105-a to UEs 115 by one or more wireless repeaters 215, which may be an example of a repeater 140 described with reference to wireless communications system 100. Repeaters 215 may relay signals 205 to UEs 115 to avoid interference by a jammer 210.

Base station 105-a may transmit signal 205-a to UE 115-a. This signal may not be interfered with by a jammer 210 or obstructed by a physical object. In this case, the signal 205-a may be transmitted directly to UE 115-a without being relayed by a repeater (e.g., a repeater 215). Base station 105-a may transmit signal 205-a using a particular frequency (e.g., $f_0$) and a phase rotation (e.g., $\varphi_0$).

Phase rotations used by base station 105-a may involve a phase rotation of OFDM symbols in a signal transmission, which may be applied to the symbols before they are transformed from the frequency domain to the time domain. The phase rotation may be based on the RF, where the complex-valued OFDM baseband signal may be described according to the following equation:

$$Re\{s_l^{(p,\mu)}(t)e^{-j2\pi f_0(t-t_{start,l}^\mu-N_{CP,l}^\mu T_c)}\} \quad (1)$$

In the above equation, $t_{start,l}^\mu$ is defined as:

$$t_{start,l}^\mu = \begin{cases} 0, l = 0 \\ t_{start,l-1}^\mu + (N_u^\mu + N_{CP,l-1}^\mu)T_c \end{cases} \quad (2)$$

Further, p is an antenna port, μ is a subcarrier frequency, $N_{CP}^\mu$ is the cyclic prefix (CP) length in samples for the $l^{th}$ symbol, $N_u^\mu$ is an OFDM symbol length in units of T, $T_c$ is the sampling interval in the baseband frequency, $f_0$ is the carrier frequency, and l is the symbol index.

Based on Equations 1 and 2, the phase rotation term for the $l^{th}$ symbol in a signal may be defined as:

$$\varphi_0 \triangleq e^{-j2\pi f_0(t_{start,l}^\mu+N_{CP,l}^\mu T_c)} \quad (3)$$

The phase rotation may allow the frequency waveform to be independent of and unaffected by the FFT size and inverse-fast-Fourier transform (IFFT) size, and independent of the location of the RF LO. The same frequency (e.g., $f_0$) may be applied for the TDD transmissions for all UEs 115 in a coverage region. For instance, base station 105-a may apply the same frequency for all TDD transmissions to multiple different UEs 115. The same phase rotation $\varphi_{0,l}$ may also be applied on all tones within symbol l, that may also be applied to transmissions to different UEs 115.

Phase rotation may be applied for different frequency bands or frequency ranges. For example, phase rotation of the frequency by base station 105-a may be used for the sub-6 frequency band (i.e., frequency range 1 (FR1), 450 to 6000 megahertz (MHz)) and the mmW frequency band (i.e., frequency range 2 (FR2), 24250 to 52600 MHz).

The baseband phase rotation may depend on a single RF carrier frequency (e.g., $f_0$). The phase-rotation may not depend on the sub-carrier index with a set of OFDM symbols or within a certain OFDM symbol. In cases where RF translation by a repeater 215 is used (e.g., where line-of-sight and non-line of sight channels may be limited by RF jammers 210), repeaters 215 may heterodyne signals to different frequency bands.

Heterodyning may include the generation of a different frequency by mixing two or more RF signals. Repeaters 215 may perform heterodyning to produce a different frequency on which to relay the initial transmission, in order to both avoid physical obstructions and RF jammers 210 that may be blocking the direct transmission from base station 105-*a* to the UE 115. RF jammers 210 may, in some cases, also block the relayed signal 205 from the repeater 215, if the repeater 215 uses the same frequency as the initial transmission from base station 105-*a*.

Heterodyning by the repeater 215 may translate the signal 205 to a different RF band, which may be away from the RF band that is interfered with by the jammer 210. Frequency translation by a repeater 215 may also be tunable to avoid RF jammers 210 set to different frequencies in different situations. Base station 105-*a* may control parameters such as direction, frequency gains, and frequency translation of the repeater 215 in a coverage region. In some cases, the configuration of the repeaters 215 may be indicated to the repeaters 215 via signaling from base station 105-*a*. In some examples, the configuration of the repeaters 215 may include a configuration to apply a phase rotation adjustment to a signal 205 that is repeated or retransmitted by the repeaters 215 (e.g., based on the heterodyning by the repeater 215).

Base station 105-*a* may transmit a second signal 205-*b* to UE 115-*b*. Signal 205-*b* may not be transmitted directly to UE 115-*b*, and may be relayed as signal 205-*c* by repeater 215-*a*. Signal 205-*b* may be transmitted by base station 105-*a* using a particular frequency (e.g., $f_0$) and a first phase rotation (e.g., $\varphi_0$).

Repeater 215-*b* may, in some cases, amplify the signal 205-*b* and may heterodyne the particular frequency so that signal 205-*c* is transmitted to UE 115-*b* using a different frequency and phase rotation than the transmission of signal 205-*b*. In some cases, repeater 215-*b* may also apply a phase rotation to the signal 205-*b*.

In some cases, heterodyning the signal 205-*b* by repeater 215-*a* may result in UE 115-*b* receiving the signal at a different carrier frequency. For example, base station 105-*a* may transmit signal 205-*b* using a frequency $f_0$ and a phase rotation $\varphi_0$. Repeater 215-*a* may retransmit signal 205-*c*, and may heterodyne $f_0$ to transmit the signal 205-*c* using $f_1$. Signal 205-*c* may be received by UE 115-*b* with a phase rotation $\varphi_0$ (applied to signal 205-*b* by base station 105-*a*) and over a frequency $f_1$.

The transmission of signal 205-*c* by repeater 215-*a* may be associated with a phase rotation error. When repeater 215-*a* heterodynes $f_0$ to transmit signal 205-*c* over $f_1$, an error in the phase rotation may occur, where the error may reintroduce a dependency of OFDM waveform on FFT size and RF LO location. This error may be represented by the following equation:

$$\varphi_1 \triangleq e^{-j2\pi(f_1-f_0)(t_{start,l}^\mu + N_{CP,l}^\mu T_c)} \quad (4)$$

In some cases, there may be an object blocking a signal 205 being transmitted from the base station 105 to the UE 115. The object may be a physical object or in some cases, may be a frequency jammer, such as an RF jammer 210. An RF jammer 210 may function by targeting, interfering with, blocking, or jamming, some frequencies one which transmissions are sent. As an example, an RF jammer 210 may include another wireless device (e.g., other base stations 105, UEs 115), other types of transmissions or signals (e.g., radar, satellite), or the like. RF jammers (e.g., RF jammer 210) may include RF jammers that affect transmissions through adjacent channel selectivity (ACS) jamming, in-band blocking (IBB), and out-of-band (OOB) jamming. ACS jamming may include high power transmission by an RF jammer on a frequency adjacent to the frequency targeted for jamming, such that the power of the transmission on the adjacent frequency may interfere with transmission on the targeted frequency. IBB jamming may include transmission by a jammer on the targeted band. OOB jamming may include transmission by the jammer on a frequency band outside of the targeted band, which may still interfere with the targeted band.

In some examples, base station 105-*a* may transmit a signal 205-*d* to UE 115-*c*. Base station 105-*a* may apply a first phase rotation $\varphi_0$ to signal 205-*d*, which may be transmitted over a first frequency $f_0$. The phase rotation applied by the base station 105 may be determined in accordance with equations 1, 2, and 3, as described herein. However, a LOS transmission may be blocked by an RF Jammer 210. Thus, for UE 115-*c* to receive the transmission, signal 205-*d* may be retransmitted by repeater 215-*b* via signal 205-*e*. Before signal 205-*e* is relayed, repeater 215-*b* may amplify received signal 205-*d*, and may heterodyne $f_0$ to determine a frequency $f_2$ on which to transmit signal 205-*e* to UE 115-*c*, so that it may not be blocked by jammer 210. In some examples, repeater 215-*b* may also apply a new phase rotation (e.g., $\varphi_2$) to relayed signal 205-*e*.

Once the repeater 215 heterodynes the frequency from a first frequency $f_0$ to a second frequency (e.g., $f_1$ or $f_2$), the change in frequency may not be accounted for by the phase rotation (e.g., $\varphi_0$) that was applied by base station 105-*a*. The change in frequency may cause an error in phase rotation as shown by the below equation (for the example of heterodyning from $f_0$ to $f_2$):

$$\varphi_2 \triangleq e^{-j2\pi(f_2-f_0)(t_{start,l}^\mu + N_{CP,l}^\mu T_c)} \quad (5)$$

where $\varphi_2$ is the error difference from the initial phase rotation $\varphi_0$ due to the heterodyning from $f_0$ to $f_2$.

To correct the phase rotation error from heterodyning the frequency for signal 205-*e*, base station 105-*a* may apply a phase rotation correction to symbols in the signal 205-*d* before it is transformed by the base station 105 from the frequency domain to the time domain. As described herein, base station 105-*a* may determine the phase rotation correction to apply based on the frequency into which that repeater 215 heterodynes the initial frequency $f_0$. Base station 105-*a* may have previously configured repeater 215 to heterodyne from some frequency to another frequency, so that phase rotation selected by base station 105-*a* may be determined based on the previous configuration of a repeater 215. That is, base station 105-*a* may transmit a configuration to repeater 215 that enables the repeater to heterodyne signals 205, apply phase rotation corrections to signals 205, or a combination thereof. In addition, base station 105-*a* may transmit an indication to a UE 115 that indicates which frequency the UE 115 may expect to receive a signal from base station 105-*a*. For instance, the indication may signal to the UE 115 that one or more signals from base station 105-*a* may be transmitted at a first frequency $f_0$, or a second frequency (e.g., $f_1$ or $f_2$), or the like. Similarly, the UE 115 may receive a configuration from base station 105-*a* that indicates a frequency at which signals 205 from the UE 115 may be transmitted. Such information may indicate to one or more devices whether a phase rotation adjustment may be used for a transmitted or received signal.

In some other cases, base station 105-a may not support the phase rotation correction, and a UE 115 may apply the phase rotation correction after receiving signal 205 from repeater 215. In other cases, base station 105-a may apply the phase rotation correction to a signal 205 received from a UE 115.

Figure 3:
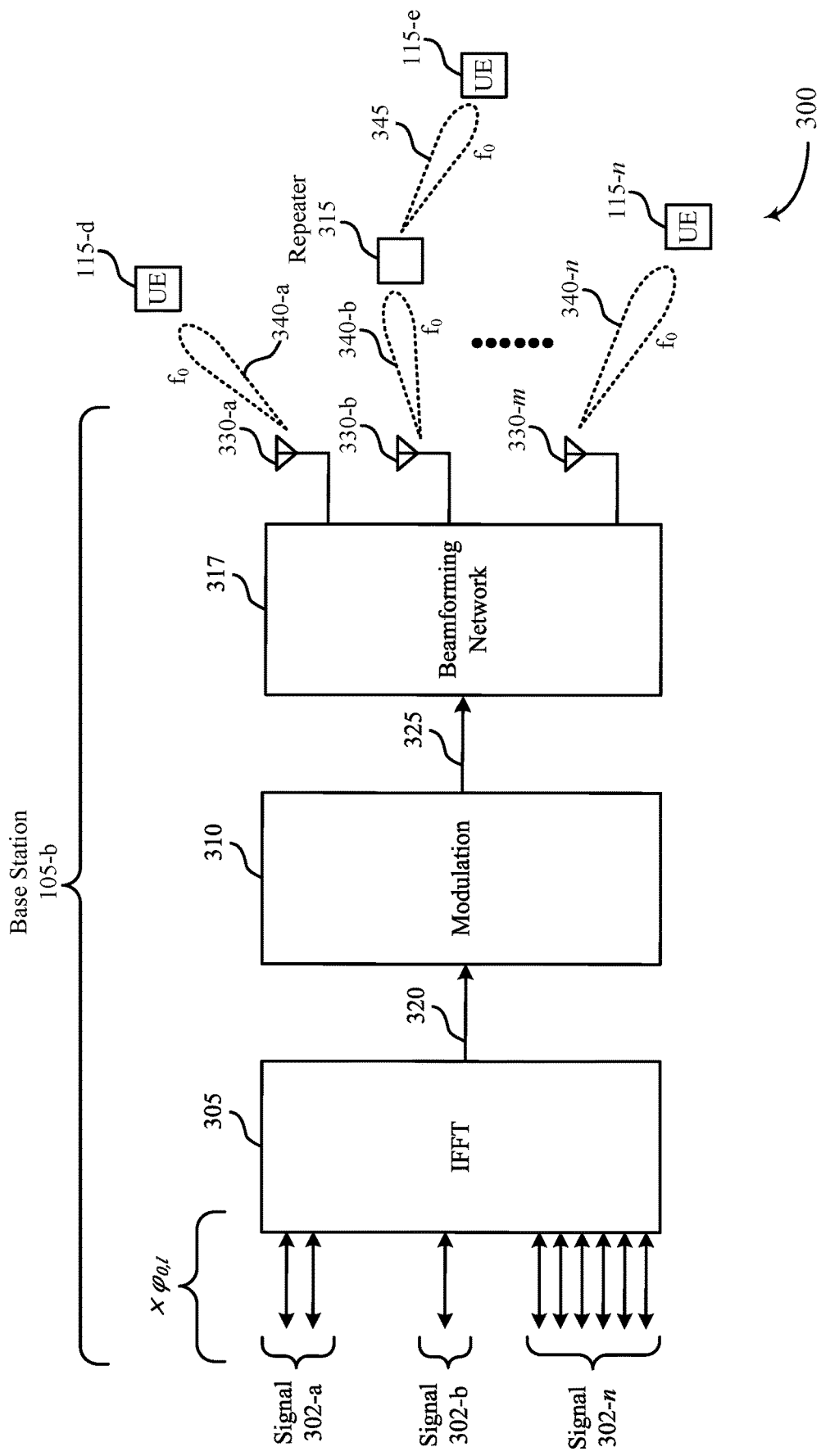
FIG. 3 illustrates an example of a system for wireless communications that supports techniques for phase rotation correction in accordance with one or more aspects of the present disclosure.

FIG. 3 illustrates an example of a wireless communications system 300 that supports techniques for phase rotation correction in accordance with one or more aspects of the present disclosure. In some examples, wireless communications system 400 may implement aspects of wireless communications systems 100 and 200. Wireless communications system 300 may include base station 105-b that generates an initial signal 302 that may be transmitted to one or more respective UEs 115 (e.g., signal 302-a, signal 302-b through signal 302-n). Wireless communications system 300 may illustrate the transmission path a signal may take from a base station 105 to a UE 115. For example, the base station 105-b may include a transmit chain for the path that signals 302 may take to transmit a signal, including transforms signals from the frequency domain to the time domain via IFFT 305, modulator 310, and beamforming network 317 (including antennas 330) at base station 105-b.

Each signal 302 may correspond to a transmitted signal 340 transmitted to a UE 115 (e.g., UE 115-d, UE 115-e, or UE 115 n). Each symbol designated for transmission to a UE 115 may include a number of tones. For example, a signal 302-a intended for UE 115-d may include two tones, whereas a signal 302-b for UE 115-e may include one tone, and a signal 302-n for a UE 115-n may include 6 tones. The signals 302 designated for transmission to a UE 115 may undergo a phase rotation of a phase rotation parameter, for example $\varphi_{0,l}$, where l is the symbol index. Accordingly, a respective phase rotation may be applied for each symbol period.

In some examples, each signal 302 generated by a base station 105 may undergo a phase rotation based on the same phase rotation equation (e.g., Equation 3), which may be based on the same carrier frequency. For example, each signal transmitted by a base station 105 may be transmitted with the same carrier frequency $f_0$. Thus, the phase rotation $\varphi_0$ for signals 302 transmitted to every UE 115 may be based on frequency $f_0$ and l according to Equation 3.

Each signal designated for transmission by the base station 105 to a UE 115 may first have the phase rotation applied, then be transformed from the frequency domain to the time domain. This transformation may be performed through an IFFT 305. At 320, the time-domain signal may pass through a modulator 310 to undergo modulation. At 325, the modulated time-domain signal may pass through to a beamforming network 317 for transmission. The transmitted signal 340 may be sent to a UE 115 via one or more antennas 330 of the base station 105. In some examples, the transmitted signal 340 may be transmitted using beamforming techniques (e.g., in accordance with mmW communications), and the transmitted signal 340 may thus be a directional beam.

As illustrated by wireless communications system 300, a set of tones in signal 302-a may be allocated for transmission to UE 115-d. In this example, the signal may include two tones. Signal 302-a may be transformed through IFFT 305, modulator 310, and the resulting transmitted signal 340-a may be transmitted by antenna 330-a (which may represent an antenna array) in beamforming network 317. Signal 340-a may be transmitted to a repeater 315-a over the designated carrier frequency (e.g., $f_0$) and with the phase rotation $\varphi_{0,l}$.

In some cases, signal 302-b may be scheduled for transmission to UE 115-e. The signal may undergo a phase rotation applied by the base station 105 according to Equations 1, 2, and 3, and depending on the number of tones 1. After transformation to a frequency domain signal, antenna 330-b may transmit signal 340-b according to its phase rotation $\varphi_{0,l}$ and frequency $f_0$. Repeater 315 may amplify the signal and retransmit the signal 340-b to UE 115-e. In such cases, the same frequency may be used for all transmissions in wireless communications system 300, and the retransmission of signal 345 may be at frequency $f_0$.

In some cases, there may be no detection of a physical obstruction or of an RF jammer, and thus there may not be a use for a repeater 315. In other cases, there may not be a repeater 315 located between base station 105-b and UE 115-n. In these cases, the transmission of a signal 302-n may still include an initial phase rotation by base station 105-b, and a transformation from time to domain to frequency domain. Antenna 330-m may transmit signal 340-n directly to UE 115-n without a repeater amplifying or changing parameters of the signal (such as frequency or phase rotation).

However, in the presence of a jammer or other interference, a signal retransmitted by a repeater 315 (e.g., signal 345) may be affected, impacting communications between base station 105-b and UE 115-e. As a result, repeater 315 may heterodyne the frequency used in the transmission of signal 340-b (e.g., $f_0$) to produce a different frequency (e.g., $f_1$). For example, and as described herein, the transmitted signal 340-b may be heterodyned based on the presence of one or more interfering signals that affect communications between base station 105-b and UE 115-e (such as a nearby jammer). In such cases, base station 105-b may apply a correction to the phase rotation based on the knowledge that repeater 315 may heterodyne the transmitted signal 340. Additionally or alternatively, wireless repeater 315 may apply a phase rotation (e.g., corresponding to a carrier frequency with which the retransmitted signal 345) that may be different from the phase rotation that the transmitted signal 340-b was transmitted with. In some cases, repeater 315 may be an example of an analog repeater, a digital repeater, or a combination thereof.

Thus, repeater 315 may relay transmitted signal 340-b as retransmitted signal 345 to UE 115-d using carrier frequency $f_1$. This may be done through a configuration by base station 105-b for the repeater 315 to relay the signal, or due to a physical obstruction or jamming signal. Additionally or alternatively, repeater 315 may heterodyne $f_0$ to a third frequency $f_2$. The heterodyning of the frequency by repeater 315 may also lead to a change in phase rotation (as shown in Equation 5) that may lead to dependency of the waveform on the size of the FFT/IFFT size and of the RF LO location. As described further in detail below, to correct for the phase rotation error caused by the heterodyning of the frequency, the base station 105 may apply a phase rotation correction to each symbol of a signal intended for respective UEs 115. In other examples, the repeater 315 may apply the phase rotation correction to each symbol of a signal intended for respective UEs 115.

Figure 4:
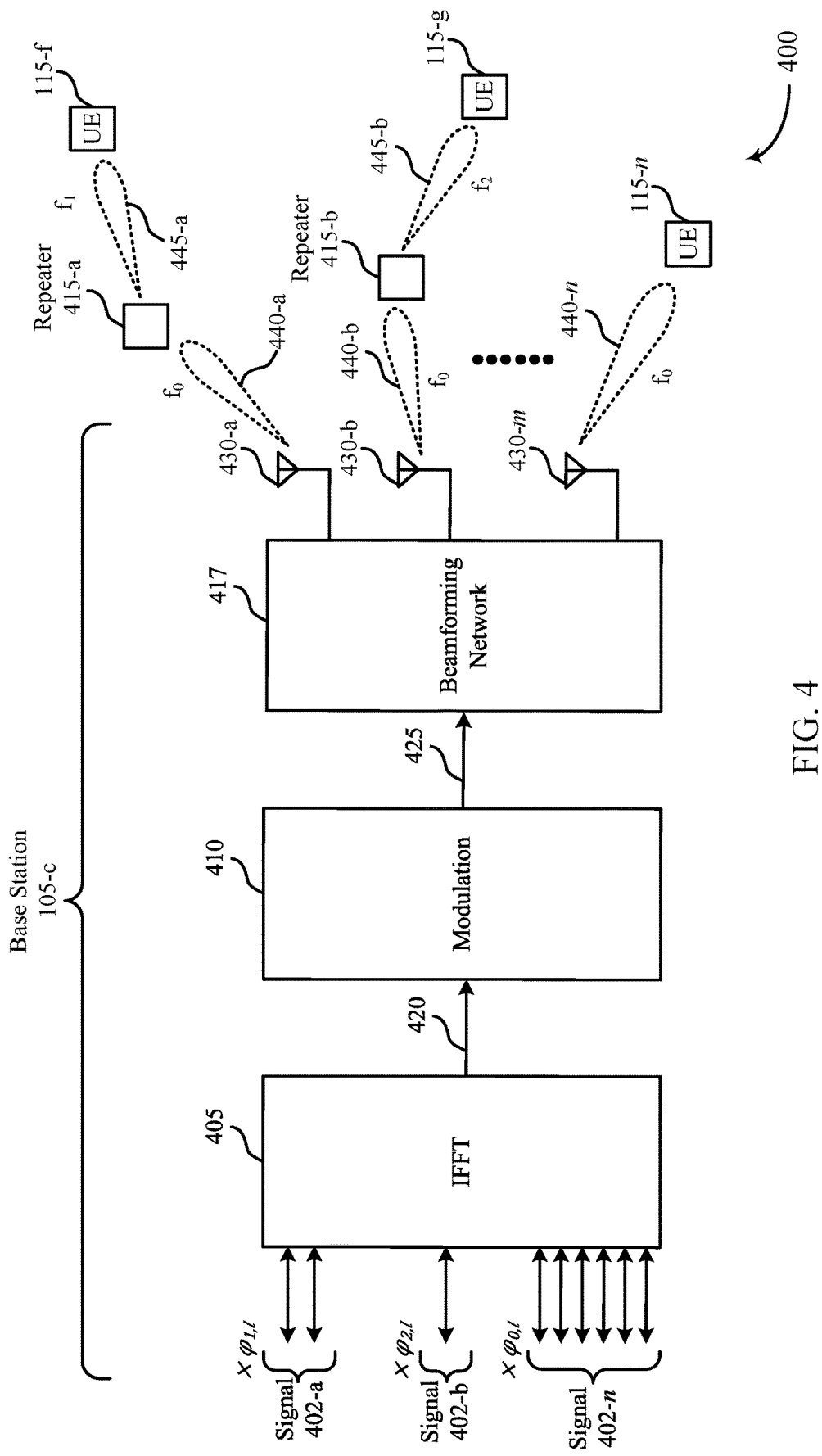
FIG. 4 illustrates an example of a system for wireless communications that supports techniques for phase rotation correction in accordance with one or more aspects of the present disclosure.

FIG. 4 illustrates an example of a wireless communications system 400 that supports techniques for phase rotation correction in accordance with one or more aspects of the present disclosure. In some examples, wireless communications system 400 may implement aspects of wireless communications system 200 or wireless communications system 300. Wireless communications system 400 may include base station 105-c that generates an initial signal 402 that may be transmitted to one or more respective UEs 115 (e.g., signal 402-a, signal 402-b through signal 402-n). Base station 105-c may include the transmit chain for the path that each signal 402 may take to transform from the frequency domain to the time domain, including IFFT 405 within base station 105-c, modulator 410 within base station 105-c, and beamforming network 417 including antennas 430 within base station 105-c. The signal may correspond to a signal transmitted to a respective UE 115 (e.g., UE 115-f, UE 115-g, or UE 115-n). The transmitted signal 440 may, in some cases, be transmitted by one or more antenna(s) 430 (or an antenna array) to a repeater 415 which may send the retransmitted signal 445 to a UE 115.

Wireless communications system 400 may operate similarly to wireless communications system 300. A signal may be transformed from a frequency domain to a time domain by passing through an IFFT 405, via signaling 420 to modulator 410, via signaling 425 to beamforming network 417. The signal 402 may be transmitted by base station 105-c via antennas 430 to UEs 115. The transmission of signal 440 to UEs 115 may be direct or may be relayed by repeater 415 as a retransmitted signal 445. For instance, repeaters 415 may relay the signal due to the presence of RF jammers or physical obstructions that may interrupt, for example, LOS or NLOS transmissions from base station 105-c to UEs 115.

As described herein, base station 105-c may apply a phase rotation adjustment to the tones in each signal designated for each UE 115. For instance, rather than applying the same phase rotation (e.g., phase rotation $\varphi_{0,l}$ as described with reference to wireless communications system 300), base station 105-c may apply a different phase rotation to each signal for each UE 115. Base station 105-c may apply the phase rotation adjustment based on the frequency that the corresponding repeater 415 may heterodyne the initial frequency to for communications. The heterodyning frequency may be determined by base station 105-c in control information transmitted to repeaters 415 that may configure the repeaters 415.

For example, base station 105-c may have previously communicated with repeater 415-a to designate a heterodyning frequency (e.g., $f_1$) for repeater 415-a. Based on that heterodyning frequency $f_1$, on which the repeater 415-a may transmit a retransmitted signal 445-a to UE 115-f, base station 105-c may apply a phase rotation adjustment to the initial symbols of the signal designated for the UE 115-f. Base station 105-c may be aware of the phase error due to the heterodyning of $f_0$ to $f_1$. As described herein, the phase rotation error due to the frequency translation that occurs at the repeater may be described by the following equation:

$$\varphi_1 \triangleq e^{-j2\pi(f_1-f_0)(t_{start,l}^\mu + N_{CP,l}^\mu T_c)} \quad (4)$$

The phase rotation applied by base station 105-c may occur before IFFT process may also introduce an error. The error of the phase rotation at base station 105-c and the error of the phase rotation at repeater 415-a (either actively applied by repeater 415-a or due to the heterodyned frequency) may combine for an overall phase rotation error according to the following equation:

$$\varphi_0 \times \varphi_1 \triangleq \varphi_1 = e^{-j2\pi f_1(t_{start,l}^\mu + N_{CP,l}^\mu T_c)} \quad (6)$$

In order to negate this overall phase rotation error, which may re-introduce dependency of the frequency transmission waveform on the FFT size and the RF LO location, an additional phase rotation may be added, for example, prior to the IFFT 405 of signal 402-a. This phase rotation correction applied at the initiation of the signal at the base station 105-c may then negate or counteract the error produced at the repeater 415-a due to the heterodyning of the signal from initial frequency $f_0$ transmitted from the base station 105-c to the heterodyned frequency $f_1$.

The additional phase rotation may be chosen based on the predicted phase rotation error, and may be determined according to the following equation:

$$e^{-j2\pi f_n(t_{start,l}^\mu + N_{CP,l}^\mu T_c)} \quad (7)$$

where $f_n$ may be the frequency that the corresponding repeater transmits over. Further, $t_{start,l}^\mu$ is a starting position of an OFDM symbol l for a subcarrier spacing configuration p in a subframe, $N_{CP,l}^\mu$ is a CP length in samples for the OFDM symbol l, and $T_c$ is the sampling interval in the baseband. In the example of repeater 415-a, the phase rotation correction applied at the base station 105-c may be calculated according to heterodyned frequency $f_1$. In such cases, the base station 105-c may determine that a UE 115 may receive a signal at a carrier frequency that is different from the frequency that base station 105-c used to transmit (e.g., due to the use of one or more repeaters). The base station 105-c may then apply the additional phase rotation (e.g., a phase rotation correction) that is based on the carrier frequency the repeater 415 uses to retransmit the signal.

A different additional phase rotation may be applied to the tones of a signal 402, which may be based on the frequency that a transmitted signal 440 is to be relayed on, rather than a same phase rotation applied to all signals 402. For example, signal 402-b may be designated for transmission to UE 115-g via a repeater 415-b. The transmitted signal 440-b may be transmitted by one or more antennas 430-b (or an antenna array) of base station 105-c, and the signal may be transmitted using a frequency $f_0$. Repeater 415-b may be configured to heterodyne the signal 440-b from $f_0$ to $f_2$. Due to the heterodyned signal, a phase rotation error may be introduced to the signal, which may be described according to the following equation:

$$\varphi_0 \times \varphi_2 \triangleq \varphi_2 = e^{-j2\pi f_2(t_{start,l}^\mu + N_{CP,l}^\mu T_c)} \quad (8)$$

As such, base station 105-c may apply a phase rotation correction $\varphi_{2,l}$ before the transformation from the frequency domain to the time domain, so that the phase rotation of signal 402-b may be distinct to the heterodyning configuration of the corresponding repeater 415-b. In such cases, the base station 105-c may preemptively correct the phase rotation error prior to IFFT 405. The phase rotation $\varphi_{2,l}$ applied to each tone in signal 402-b may vary based on the frequency repeater 415-a uses for frequency translation, where the phase rotation $\varphi_{2,l}$ may be applied on a symbol-by-symbol basis. The phase rotation $\varphi_{2,l}$ for signal 402-b may be distinct to that signal and its corresponding repeater, and may be different from the pre-rotation $\varphi_{1,l}$ applied to signal 402-a that corresponds to the heterodyning of repeater 415-a.

Signal 402-n may be designated for transmission to UE 115-n. In some cases, the transmission to UE 115-n may not be affected by an RF jammer or other physical obstruction or no repeater 415 may be used to retransmit signal 440-n.

In this case, the signal may have a phase rotation $\varphi_{0,l}$ based on the signal 440-$n$ not being relayed by a repeater 415 after transmission by one or more antennas 430-$m$.

Additionally, it should be noted that the operations in wireless communications system 400 performed by a UE 115 and base station 105 may be performed by a UE 115, a base station 105, or another wireless device, and the example shown should not be construed as limiting. For instance, the operations shown as performed by base station 105-$c$ may be performed by a UE 115, and the operations shown as performed by a UE 115 may be performed by a base station 105.

Figure 5:
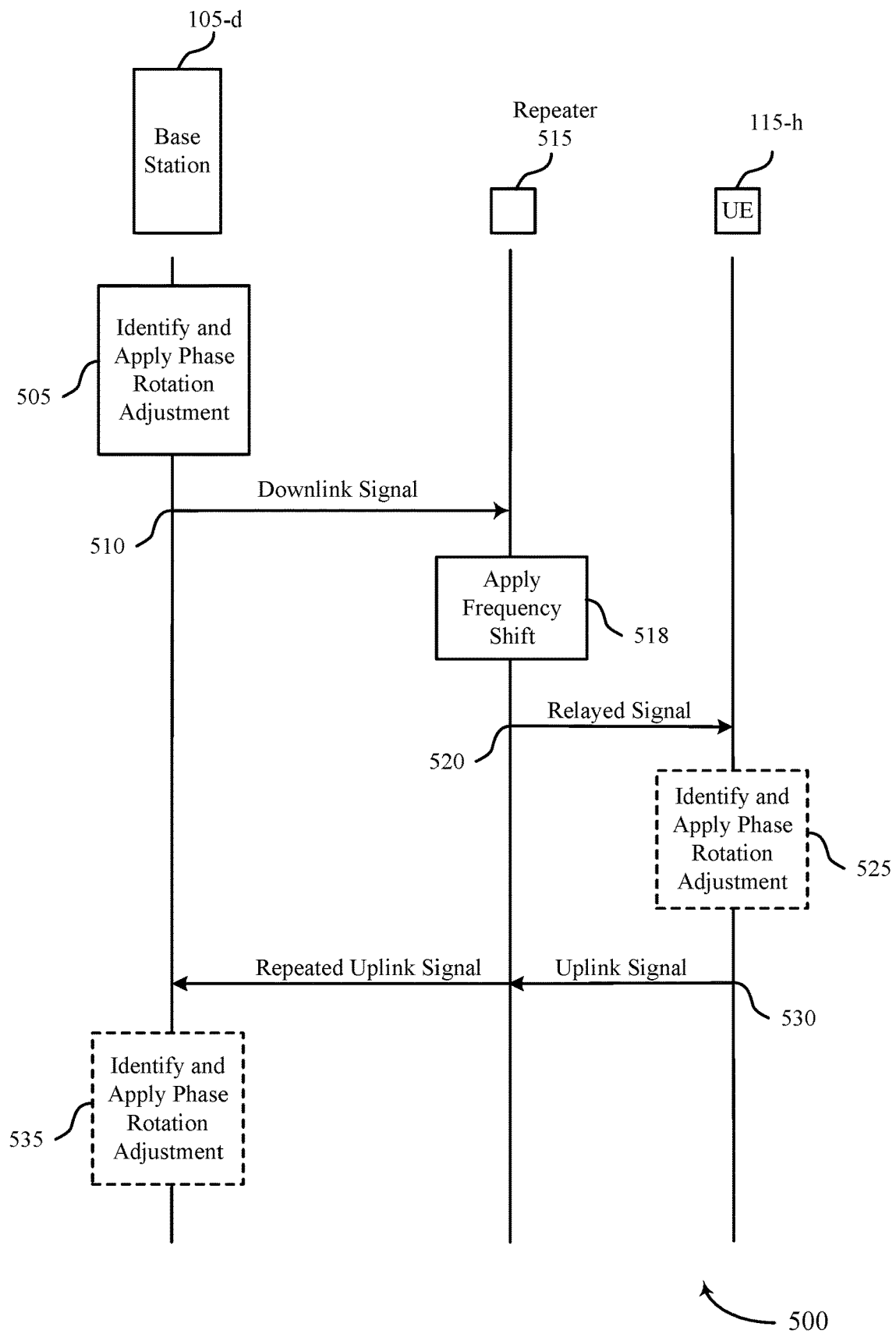
FIG. 5 illustrates an example of a process flow that supports techniques for phase rotation correction in accordance with one or more aspects of the present disclosure.

FIG. 5 illustrates an example of a process flow 500 that supports techniques for phase rotation correction in accordance with one or more aspects of the present disclosure. The process flow 500 may illustrate an example of a techniques for phase rotation. For example, a base station 105-$d$ may configure phase rotation for a signal to be transmitted to a UE 115 (e.g., UE 115-$h$) via a repeater 515. UE 115-$h$ may be an example of a corresponding UE 115 as described with reference to FIGS. 1-4. Repeater 515 may be an example of a repeater 140, 215, 315, or 415 as described with reference to FIGS. 1-4. Base station 105-$d$ may be an example of a base station 105 as described with reference to FIGS. 1-4.

At 505, base station 105-$d$ may identify and apply a phase rotation adjustment. This phase rotation adjustment may be based on the base station 105-$d$ determining that a transmission of a signal at a first carrier frequency will be received by a second device (e.g., UE 115) at a second carrier frequency that is different from the first carrier frequency. In some cases, the determination may be based on a configuration or transmission by base station 105-$d$. For instance, base station 105-$d$ may transmit, to UE 115-$h$, an signal that indicates a first carrier frequency for transmitting or receiving a signal. Based on this determining, base station 105-$d$ may identify a phase rotation adjustment for the signal, the phase rotation adjustment corresponding to the second carrier frequency. Base station 105-$d$ may then apply the phase rotation adjustment to the signal. Base station 105-$d$ may also identify one or more resources blocks that may be allocated to the second device. The phase rotation adjustment may be applied to each of the identified one or more RBs.

The application of the phase rotation adjustment to the signal at 505 may also include base station 105-$d$ determining a configuration of wireless repeater 515. The phase rotation adjustment applied by base station 105-$d$ at 505 may be based on the determined configuration of wireless repeater 515. The configuration of wireless repeater 515 may include a frequency translation from the first carrier frequency (e.g., $f_0$) to the second carrier frequency (e.g., $f_1$). The applied phase rotation adjustment may be based on the frequency translation between the first carrier frequency and the second carrier frequency. The configuration of wireless repeater 515 may further include a phase rotation adjustment configuration for use by the wireless repeater 515.

The identification of the phase rotation adjustment at 505 by base station 105-$d$ may include selecting the phase rotation adjustment from one or more phase rotation adjustments for a set of carrier frequencies that are different from the first carrier frequency (e.g., $f_0$). Each carrier frequency of the set of carrier frequencies may correspond to a respective phase rotation adjustment. The identifying of the phase rotation may include identifying the one or more phase rotation adjustments using a phase rotation table. The phase rotation table may correlate different carrier frequencies with different phase rotation adjustments.

The application of the phase rotation adjustment by base station 105-$d$ at 505 may include applying the phase rotation adjustment to the signal based on respective indexes of one or more symbol periods, where the phase rotation adjustment applied to the signal for transmission during the one or more symbol periods may be calculated based on the respective index.

The phase rotation adjustment applied at 505 by base station 105-$d$ may include applying the phase rotation adjustment to the signal prior to a transformation of the signal from a frequency domain signal to a time domain signal. This transformation may include an IFFT step and a modulation step as described with respect to wireless communications systems 300 and 400 (e.g., IFFT 305 and 405, and modulator 310 and 410). The phase rotation adjustment may be determined by base station 105-$d$ using an equation including $e^{-j2\pi f_n(t_{start,l}+N_{CP,l}T^c)}$, as described herein.

At 510, base station 105-$d$ may transmit the downlink signal. Base station 105-$d$ may transmit, to the second device, the signal including the applied phase rotation adjustment. In some cases, the downlink signal may be transmitted to a repeater 515 using an antenna of base station 105-$d$. The signal may be transmitted according the phase rotation adjustment and the first carrier frequency.

In cases where the signal at 510 is transmitted to a wireless repeater, then at 510, repeater 515 may also receive the downlink signal transmitted by base station 105-$d$. Repeater 515 may receive the signal on the first carrier frequency.

In another case, base station 105-$d$ may determine that transmission of a second signal at the first carrier frequency may be received by a third device at a third carrier frequency that is different from the first carrier frequency. Base station 105-$d$ may identify a second phase rotation adjustment for the second signal. The second phase rotation adjustment may correspond to the third carrier frequency. Base station 105-$d$ may apply the second phase rotation adjustment to the second signal. The phase rotation adjustment may be applied to the signal and the second phase rotation adjustment may be applied to the second signal for the same symbol period. Base station 105-$d$ may then transmit, to the third device, the second signal including the applied second phase rotation adjustment.

At 518, repeater 515 may apply a heterodyned frequency shift in accordance with its configuration as previously determined in signaling from base station 105-$d$. For example, repeater 515 may heterodyne the first carrier frequency ($f_0$) to the second carrier frequency (e.g., $f_1$). In some examples, repeater 515 may also apply a phase rotation to the signal. For instance, the signal received from base station 105-$d$ may exclude a phase rotation correction, and repeater 515 may be configured to apply the phase rotation based on a received configuration from base station 105-$d$. At 520, repeater 515 may relay the signal to UE 115-$h$ based using the applied phase rotation and the second carrier frequency.

At 520, UE 115-$h$ may receive a signal on a first carrier frequency. In some cases, this signal may be received as relayed signal via the wireless repeater 515 operating that the first carrier frequency. In other cases, this signal may be received from base station 105-$d$ on the first carrier frequency. Upon receiving the relayed signal at 520, UE 115-$h$ may demodulate the signal and may transform the demodulated signal from a time domain signal to a frequency domain signal.

In some cases, UE 115-*h* may determine that the signal was transmitted by base station 105-*d* at the second carrier frequency that is different from the first carrier frequency. In these cases, UE 115-*h* may apply a phase rotation adjustment to the signal based on determining that the signal was transmitted by base station 105-*d* at the second carrier frequency that is different from the first carrier frequency. In these cases, UE 115-*h* may apply the phase rotation adjustment corresponding to the first carrier frequency. The phase rotation adjustment may be applied to the frequency domain signal.

At 525, UE 115-*h* may identify and apply the phase rotation adjustment for the signal. The phase rotation adjustment may be identified from a phase rotation adjustment table. The phase rotation adjustment table may include a set of carrier frequencies that are different from the second carrier frequency. Each carrier frequency in the table may correspond to a respective phase rotation adjustment.

The application of the phase rotation adjustment at 525 by UE 115-*h* may include applying the phase rotation adjustment to the signal based on respective indexes of one or more symbol periods, where the phase rotation adjustment that may be applied to the signal received during the one or more symbol periods may be calculated based on the respective indexes.

At 530, base station 105-*d* may receive a signal from UE 115-*h* on the first carrier frequency. In some cases, the signal may be received from UE 115-*h* by receiving the signal from UE 115-*h* via wireless repeater 515 operating in the first carrier frequency. After receiving the signal, base station 105-*d* may demodulate the signal and may transform the demodulated signal from a time-domain signal to a frequency domain signal, where the phase rotation adjustment may be applied to the frequency domain signal.

In some cases, base station 105-*d* may determine that the signal received from UE 115-*h* was transmitted by UE 115-*h* at a second carrier frequency that is different from the first carrier frequency. In these cases, at 535, base station 105-*d* may apply a phase rotation adjustment to the signal based on determining that the signal was transmitted by UE 115-*h* at a second carrier frequency that is different from the first carrier frequency. Base station 105-*d* may determine a configuration of wireless repeater 515, and may determine the phase rotation adjustment to apply based on the configuration of the wireless repeater. The configuration of the wireless repeater may include a frequency translation from the second carrier frequency to the first carrier frequency, and where the phase rotation adjustment may be applied based on the frequency translation.

In these cases, base station 105-*d* may identify the phase rotation adjustment to apply from a phase rotation adjustment table. The table may include a set of carrier frequencies that are different from the first carrier frequency. Each carrier frequency of the set may correspond to a respective phase rotation adjustment.

Figure 6:
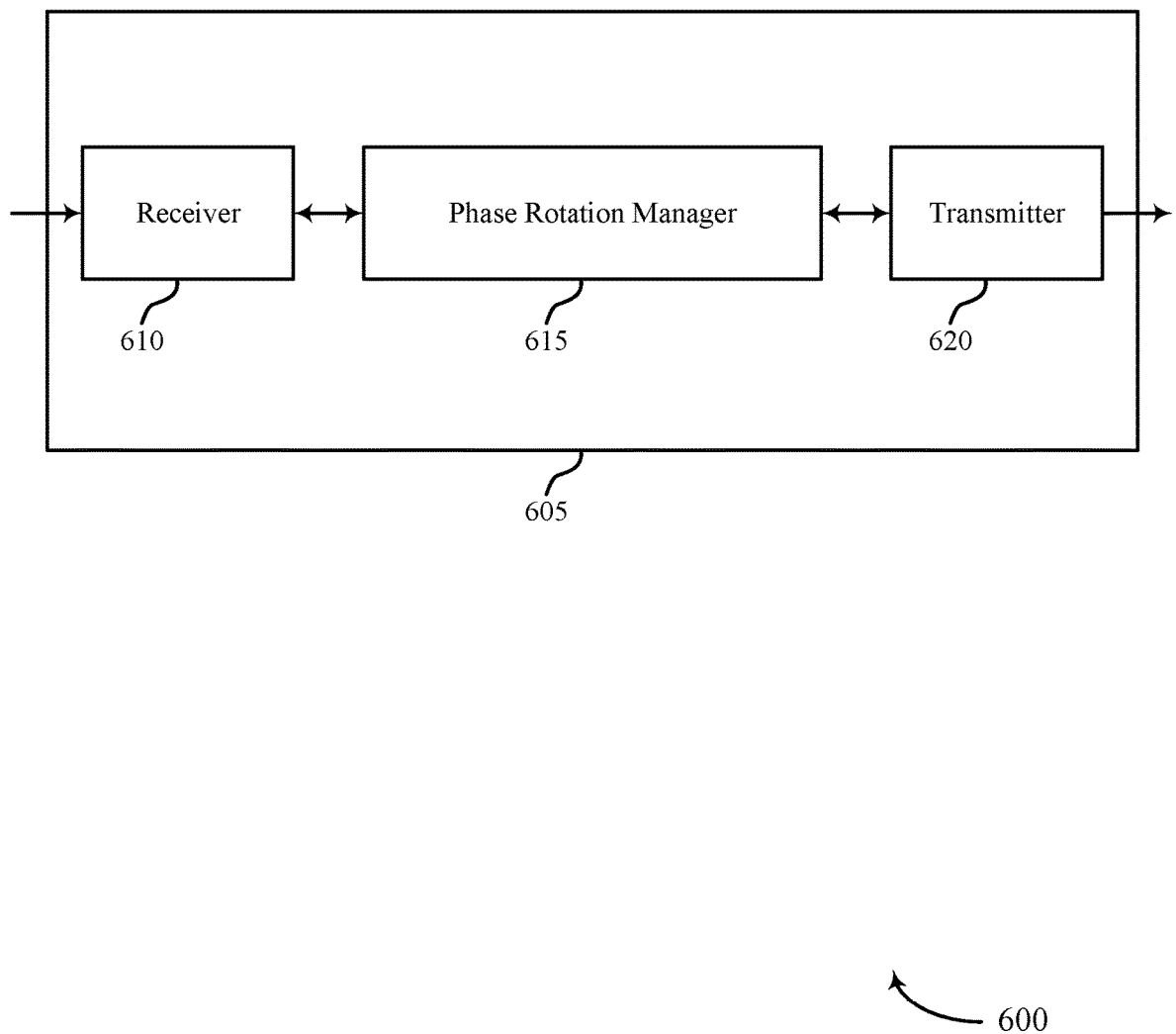
FIGS. 6 and 7 show block diagrams of devices that support techniques for phase rotation correction in accordance with one or more aspects of the present disclosure.

FIG. 6 shows a block diagram 600 of a device 605 that supports techniques for phase rotation correction in accordance with one or more aspects of the present disclosure. The device 605 may be an example of aspects of a UE 115 as described herein. Additionally or alternatively, the device 905 may be an example of a repeater 140 as described herein. The device 605 may include a receiver 610, a phase rotation manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for phase rotation correction). Information may be passed on to other components of the device 605. The receiver 610 may be an example of aspects of the transceiver 1320 described with reference to FIG. 13. The receiver 610 may utilize a single antenna or a set of antennas.

The phase rotation manager 615 may receive, from a base station 105, a signal on a first carrier frequency, determine that the signal was transmitted by the base station 105 at a second carrier frequency that is different from the first carrier frequency, and apply a phase rotation adjustment to the signal based on the determination, the phase rotation adjustment corresponding to the first carrier frequency. In some examples, the phase rotation manager 615 may receive an indication that a signal is to be transmitted by a base station at a first carrier frequency, receive, by the UE, the signal on a second carrier frequency that is different from the first carrier frequency, and apply a phase rotation adjustment to the received signal based at least in part on receiving the signal on the second carrier frequency, the phase rotation adjustment corresponding to the first carrier frequency.

The phase rotation manager 615 may also determine that a transmission of a signal at a first carrier frequency will be received by a second wireless device at a second carrier frequency that is different from the first carrier frequency, identify, based on the determination, a phase rotation adjustment for the signal, the phase rotation adjustment corresponding to the second carrier frequency, apply, by the first wireless device, the phase rotation adjustment to the signal, and transmit, to the second wireless device, the signal including the applied phase rotation adjustment. The phase rotation manager 615 may transmit an indication to a second device that indicates a first carrier frequency for receiving a signal, identify, based at least in part on the indication, a phase rotation adjustment for the signal, the phase rotation adjustment corresponding to a second carrier frequency that is different from the first carrier frequency, apply, by the first device, the phase rotation adjustment to the signal, and transmit, to the second device, the signal comprising the applied phase rotation adjustment. In some examples, the phase rotation manager 615 may receive, from a second device, a configuration of a phase rotation, receive, from the second device, a signal on a first carrier frequency. In some examples, the phase rotation manager 615 may apply a phase rotation adjustment to the signal based at least in part on the configuration and retransmit, to a third device, the signal comprising the applied phase rotation adjustment, the signal being retransmitted at a second carrier frequency.

The phase rotation manager 615 may also receive, from a UE 115, a signal on a first carrier frequency, determine that the signal was transmitted by the UE 115 at a second carrier frequency that is different from the first carrier frequency, and apply a phase rotation adjustment to the signal based on the determination, the phase rotation adjustment corresponding to the second carrier frequency. The phase rotation manager 615 may be an example of aspects of the phase rotation manager 1310 or 1410 described herein.

The phase rotation manager 615, or its sub-components, may be implemented in hardware, code (e.g., software or firmware) executed by a processor, or any combination thereof. If implemented in code executed by a processor, the functions of the phase rotation manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The phase rotation manager 615, or its sub-components, may be physically located at various positions, including being distributed such that portions of functions are implemented at different physical locations by one or more physical components. In some examples, the phase rotation manager 615, or its sub-components, may be a separate and distinct component in accordance with various one or more aspects of the present disclosure. In some examples, the phase rotation manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 1320 or 1420 described with reference to FIGS. 13 and 14. The transmitter 620 may utilize a single antenna or a set of antennas.

Figure 7:
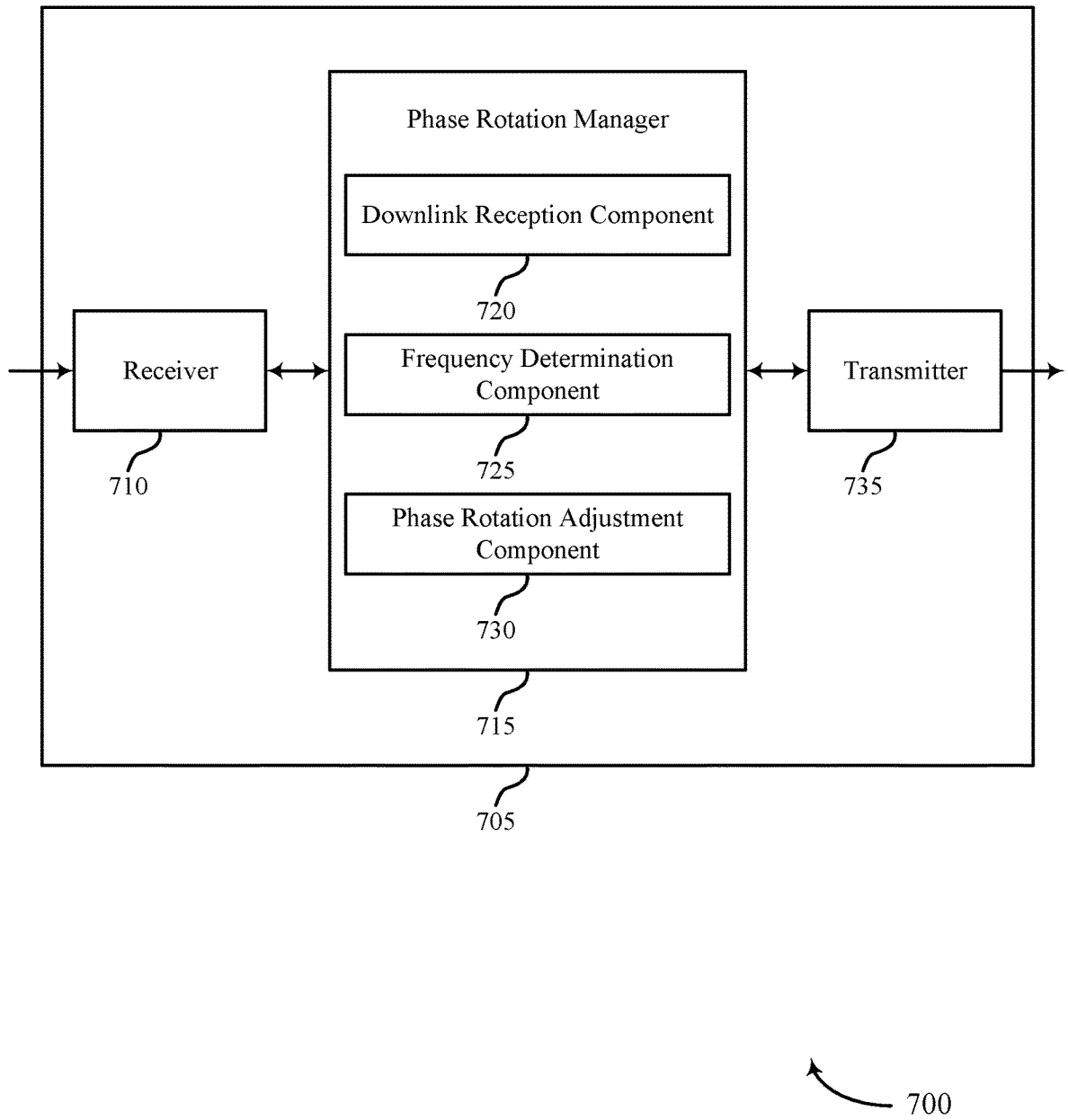

FIG. 7 shows a block diagram 700 of a device 705 that supports techniques for phase rotation correction in accordance with one or more aspects of the present disclosure. The device 705 may be an example of aspects of a device 605, or a UE 115 as described herein. The device 705 may include a receiver 710, a phase rotation manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for phase rotation correction). Information may be passed on to other components of the device 705. The receiver 710 may be an example of aspects of the transceiver 1320 described with reference to FIG. 13. The receiver 710 may utilize a single antenna or a set of antennas.

The phase rotation manager 715 may be an example of aspects of the phase rotation manager 615 as described herein. The phase rotation manager 715 may include a downlink reception component 720, a frequency determination component 725, and a phase rotation adjustment component 730. The phase rotation manager 715 may be an example of aspects of the phase rotation manager 1310 described herein.

The downlink reception component 720 may receive, from a base station 105, a signal on a first carrier frequency. The frequency determination component 725 may determine that the signal was transmitted by the base station 105 at a second carrier frequency that is different from the first carrier frequency. The phase rotation adjustment component 730 may apply a phase rotation adjustment to the signal based on the determination, the phase rotation adjustment corresponding to the first carrier frequency.

The transmitter 735 may transmit signals generated by other components of the device 705. In some examples, the transmitter 735 may be collocated with a receiver 710 in a transceiver module. For example, the transmitter 735 may be an example of aspects of the transceiver 1320 described with reference to FIG. 13. The transmitter 735 may utilize a single antenna or a set of antennas.

Phase rotation manager 715 as described herein may be implemented to realize one or more potential advantages. One implementation may allow base stations 105 and UEs 115 to mitigate and correct for the phase rotation error caused by wireless repeaters relaying a signal to avoid RF jamming. This implementation may allow the wireless communication configuration in device 705 to maintain compliance with a wireless communications standard.

Figure 8:
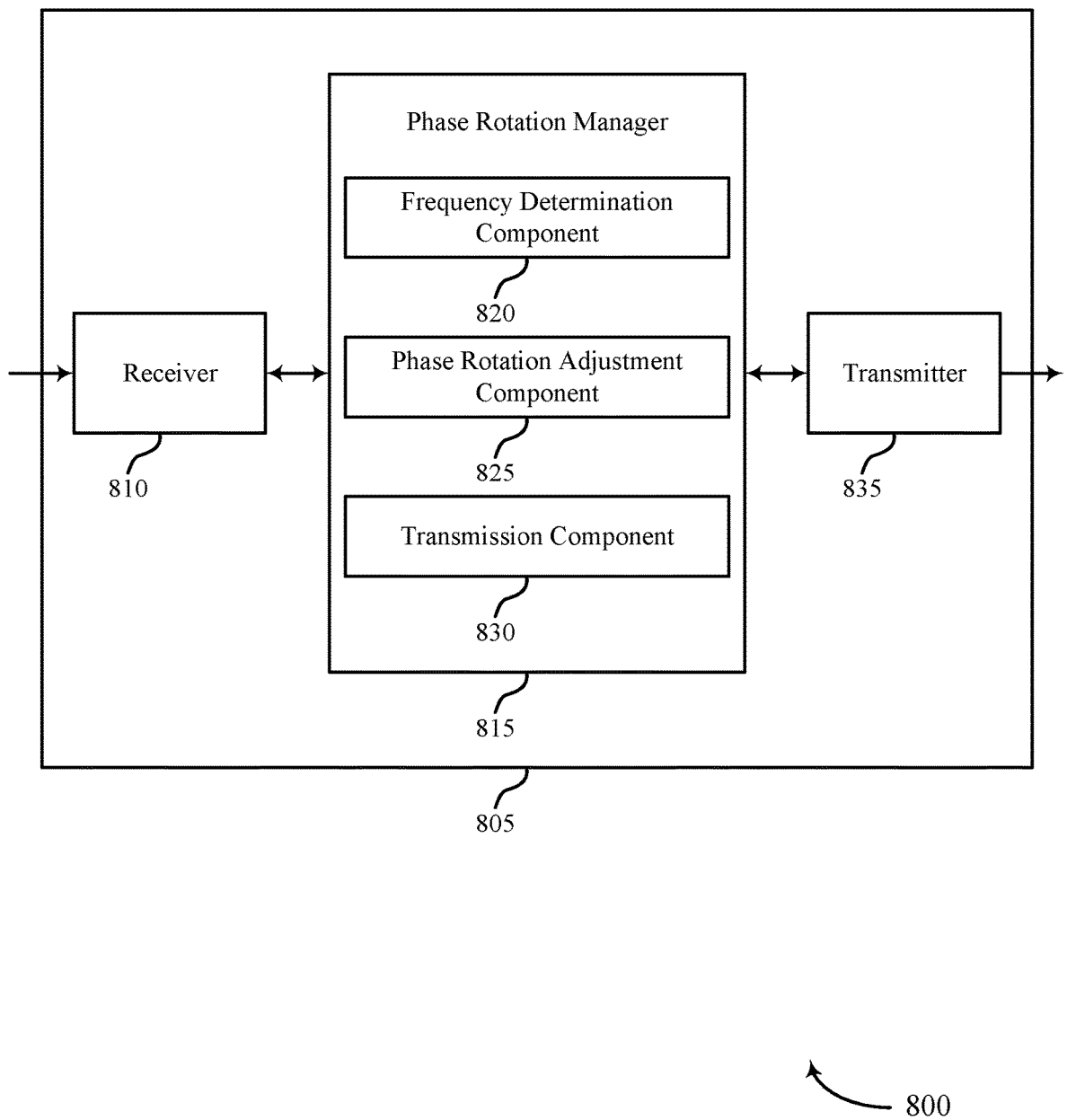
FIGS. 8 and 9 show block diagrams of devices that support techniques for phase rotation correction in accordance with one or more aspects of the present disclosure.

FIG. 8 shows a block diagram 800 of a device 805 that supports techniques for phase rotation correction in accordance with one or more aspects of the present disclosure. The device 805 may be an example of aspects of a device 1305, a UE 115, or a base station 105 as described herein. The device 805 may include a receiver 810, a phase rotation manager 815, and a transmitter 835. The device 805 may also include a processor. Each of these components may be in communication with one another (e.g., via one or more buses).

Receiver 810 may receive information such as packets, user data, or control information associated with various information channels (e.g., control channels, data channels, and information related to techniques for phase rotation correction). Information may be passed on to other components of the device 805. The receiver 810 may be an example of aspects of the transceiver 1320 or 1420 as described with reference to FIGS. 13 and 14. The receiver 810 may utilize a single antenna or a set of antennas.

The phase rotation manager 815 may be an example of aspects of the phase rotation manager 1005 as described herein. The phase rotation manager 815 may include a frequency determination component 820, a phase rotation adjustment component 825, and a transmission component 830. The phase rotation manager 815 may be an example of aspects of the phase rotation manager 1310 or 1410 as described herein.

The frequency determination component 820 may determine that a transmission of a signal at a first carrier frequency will be received by a second wireless device at a second carrier frequency that is different from the first carrier frequency.

The phase rotation adjustment component 825 may identify, based on the determination, a phase rotation adjustment for the signal, the phase rotation adjustment corresponding to the second carrier frequency and apply, by the first wireless device, the phase rotation adjustment to the signal.

The transmission component 830 may transmit, to the second wireless device, the signal including the applied phase rotation adjustment.

Transmitter 835 may transmit signals generated by other components of the device 805. In some examples, the transmitter 835 may be collocated with a receiver 810 in a transceiver module. For example, the transmitter 835 may be an example of aspects of the transceiver 1320 or 1420 as described with reference to FIGS. 13 and 14. The transmitter 835 may utilize a single antenna or a set of antennas. Based on transmitting an indication to a second device that indicates a first carrier frequency for receiving a signal, a processor of a UE 115 (e.g., controlling the receiver 810, the transmitter 835, or the transceiver 1320 as described with reference to FIG. 13) may efficiently determine a configuration of a wireless repeater that is between the first device and the second device. Further, the processor of UE 115 may select the phase rotation adjustment from one or more phase rotation adjustments for a plurality of carrier frequencies. The processor of the UE 115 may turn on one or more processing units for selecting the phase rotation adjustment, increase a processing clock, or a similar mechanism within the UE 115. As such, when the phase rotation adjustment is applied, the processor may be ready to respond more efficiently through the reduction of a ramp up in processing power.

Figure 9:
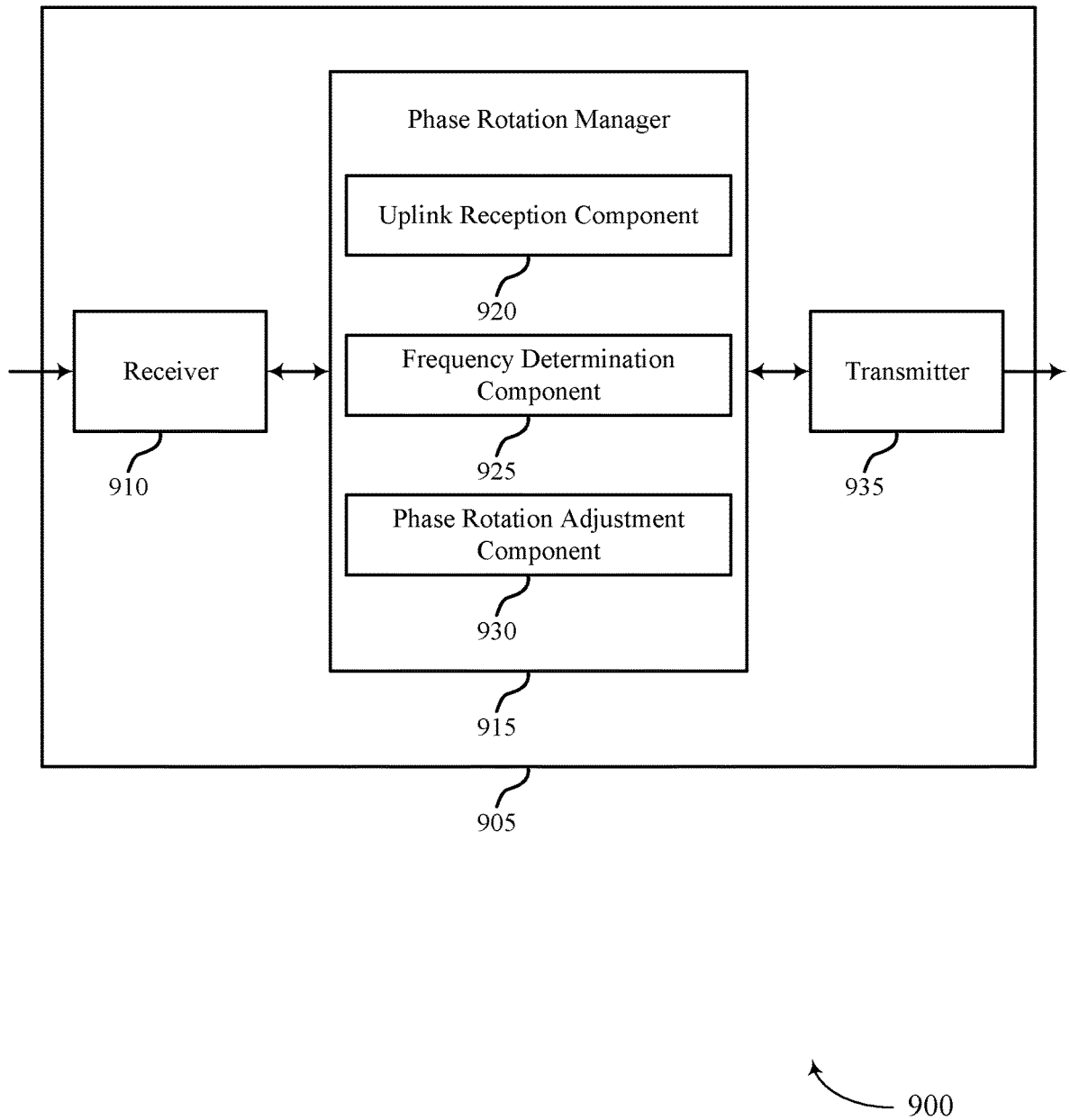

FIG. 9 shows a block diagram 900 of a device 905 that supports techniques for phase rotation correction in accordance with one or more aspects of the present disclosure. The device 905 may be an example of aspects of a device 1505, or a base station 105 as described herein. Additionally or alternatively, the device 905 may be an example of a repeater 140 as described herein. The device 905 may include a receiver 910, a phase rotation manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for phase rotation correction). Information may be passed on to other components of the device 905. The receiver 910 may be an example of aspects of the transceiver 1820 described with reference to FIG. 18. The receiver 910 may utilize a single antenna or a set of antennas.

The phase rotation manager 915 may be an example of aspects of the phase rotation manager 1410 as described herein. The phase rotation manager 915 may include an uplink reception component 920, a frequency determination component 925, and a phase rotation adjustment component 930. The phase rotation manager 915 may be an example of aspects of the phase rotation manager 1310 or the phase rotation manager 1410 described herein.

The uplink reception component 920 may receive, from a UE 115, a signal on a first carrier frequency. The frequency determination component 925 may determine that the signal was transmitted by the UE 115 at a second carrier frequency that is different from the first carrier frequency. The phase rotation adjustment component 930 may apply a phase rotation adjustment to the signal based on the determination, the phase rotation adjustment corresponding to the second carrier frequency.

The transmitter 935 may transmit signals generated by other components of the device 905. In some examples, the transmitter 935 may be collocated with a receiver 910 in a transceiver module. For example, the transmitter 935 may be an example of aspects of the transceiver 1820 described with reference to FIG. 18. The transmitter 935 may utilize a single antenna or a set of antennas.

Figure 10:
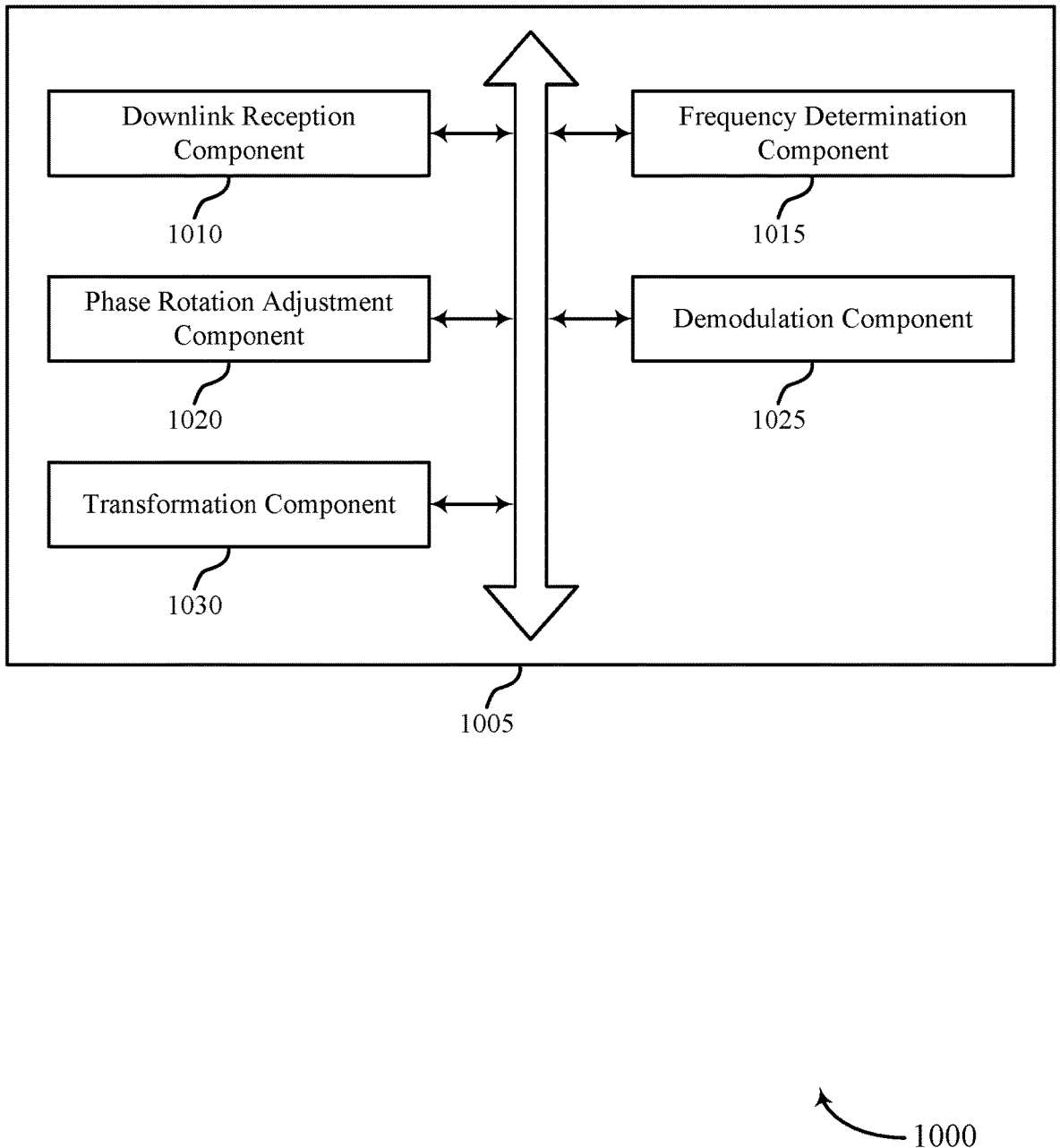
FIGS. 10 through 12 show block diagrams of phase rotation managers that support techniques for phase rotation correction in accordance with one or more aspects of the present disclosure.

FIG. 10 shows a block diagram 1000 of a phase rotation manager 1005 that supports techniques for phase rotation correction in accordance with one or more aspects of the present disclosure. The phase rotation manager 1005 may be an example of aspects of a phase rotation manager 615, a phase rotation manager 715, a phase rotation manager 815, or a phase rotation manager 1310 described herein. The phase rotation manager 1005 may include a downlink reception component 1010, a frequency determination component 1015, a phase rotation adjustment component 1020, a demodulation component 1025, and a transformation component 1030. Each of these modules may communicate, directly or indirectly, with one another (e.g., via one or more buses).

The downlink reception component 1010 may receive, from a base station 105, a signal on a first carrier frequency. In some examples, the downlink reception component 1010 may receive the signal from the base station 105 via a wireless repeater operating at the first carrier frequency. In some examples, the downlink reception component 1010 may receive a signal on a second carrier frequency that is different from the first carrier frequency. In some cases, the downlink reception component 1010 may receive, from the second device, a signal on a first carrier frequency.

The frequency determination component 1015 may determine that the signal was transmitted by the base station 105 at a second carrier frequency that is different from the first carrier frequency. The phase rotation adjustment component 1020 may apply a phase rotation adjustment to the signal based on the determination, the phase rotation adjustment corresponding to the first carrier frequency.

In some examples, the phase rotation adjustment component 1020 may identify the phase rotation adjustment from a phase rotation adjustment table including a set of carrier frequencies that are different from the second carrier frequency, each carrier frequency of the set corresponding to a respective phase rotation adjustment. In some examples, the phase rotation adjustment component 1020 may apply a phase rotation adjustment to the received signal based on receiving the signal on the second carrier frequency, the phase rotation adjustment corresponding to the first carrier frequency.

In some examples, the phase rotation adjustment component 1020 may apply the phase rotation adjustment to the signal based on respective indexes of one or more symbol periods, where the phase rotation adjustment applied to the signal received during the one or more symbol periods is calculated based on the respective indexes.

The demodulation component 1025 may demodulate the signal. The transformation component 1030 may transform the demodulated signal from a time-domain signal to a frequency-domain signal, where the phase rotation adjustment is applied after the transformation.

Figure 11:
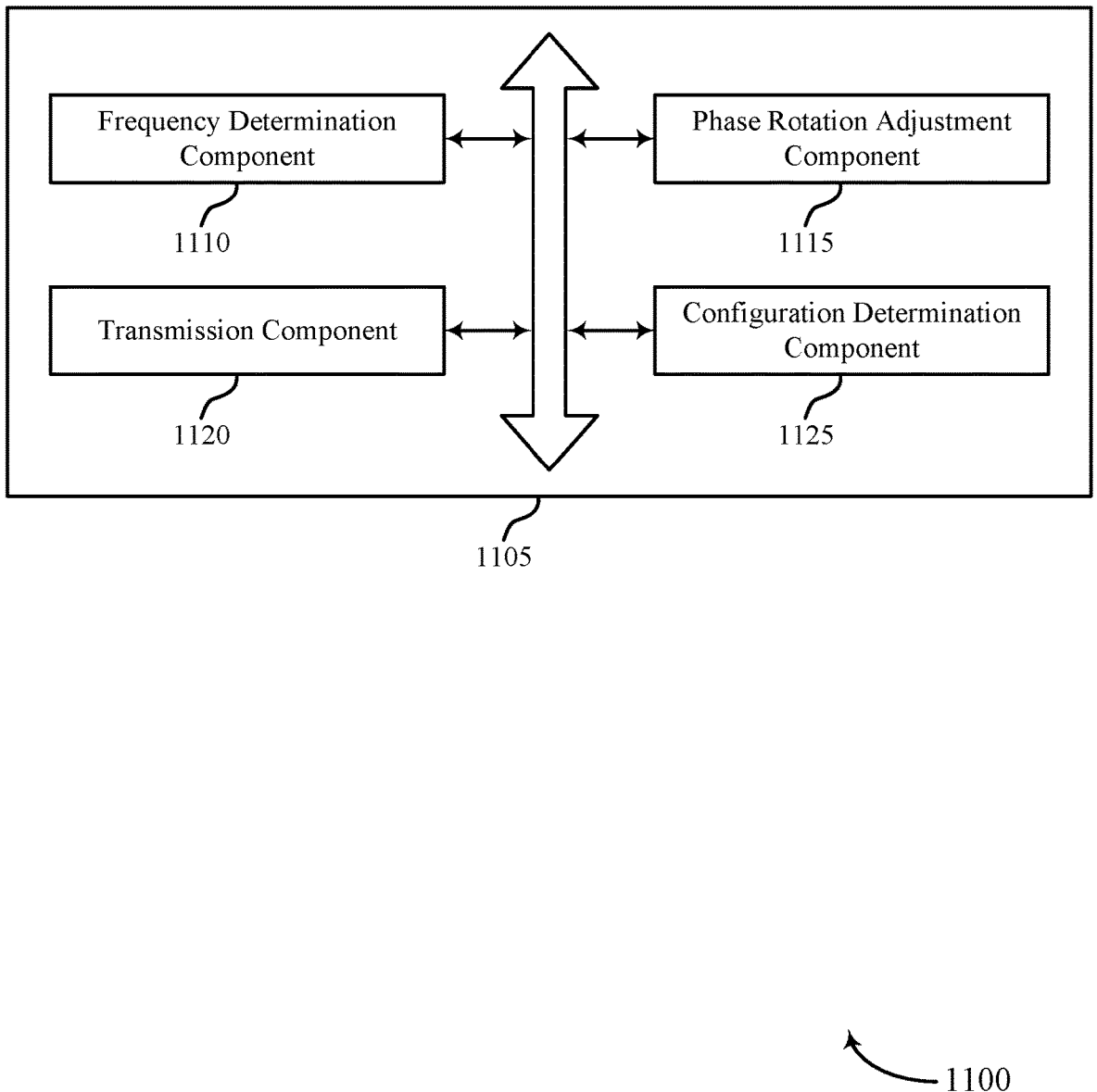

FIG. 11 shows a block diagram 1100 of a phase rotation manager 1105 that supports techniques for phase rotation correction in accordance with one or more aspects of the present disclosure. The phase rotation manager 1105 may be an example of aspects of a phase rotation manager 615, a phase rotation manager 715, a phase rotation manager 815, a phase rotation manager 915, or a phase rotation manager 1310 described herein. The phase rotation manager 1105 may include a frequency determination component 1110, a phase rotation adjustment component 1115, a transmission component 1120, and a configuration determination component 1125. Each of these modules may communicate, directly or indirectly, with one another (e.g., via one or more buses).

The frequency determination component 1110 may determine that a transmission of a signal at a first carrier frequency will be received by a second wireless device at a second carrier frequency that is different from the first carrier frequency.

In some examples, the frequency determination component 1110 may determine that a transmission of a second signal at the first carrier frequency will be received by a third wireless device at a third carrier frequency that is different from the first carrier frequency. In some examples, the frequency determination component 1110 may transmit an indication to a second device that indicates a first carrier frequency for receiving a signal. In some examples, the frequency determination component 1110 may receive, from a base station 105, an indication that a signal is to be transmitted by a base station 105 at a first carrier frequency.

The phase rotation adjustment component 1115 may identify, based on the determination, a phase rotation adjustment for the signal, the phase rotation adjustment corresponding to the second carrier frequency. In some examples, the phase rotation adjustment component 1115 may apply, by the first wireless device, the phase rotation adjustment to the signal.

In some examples, the phase rotation adjustment component 1115 may select the phase rotation adjustment from one or more phase rotation adjustments for a plurality of carrier frequencies that are different from the first carrier frequency, each carrier frequency of the set corresponding to a respective phase rotation adjustment. In some examples, the phase rotation adjustment component 1115 may identify the one or more phase rotation adjustment using a phase rotation adjustment table.

In some examples, the phase rotation adjustment component 1115 may apply the phase rotation adjustment to the signal based on respective indexes of one or more symbol periods, where the phase rotation adjustment applied to the signal for transmission during the one or more symbol periods is calculated based on the respective indexes.

In some examples, the phase rotation adjustment component 1115 may identify a second phase rotation adjustment for the second signal, the second phase rotation adjustment corresponding to the third carrier frequency. In some examples, the phase rotation adjustment component 1115 may apply the second phase rotation adjustment to the second signal. In some examples, the phase rotation adjustment component 1115 may apply the phase rotation adjustment to the signal and the second phase rotation adjustment to the second signal for a same symbol period.

In some examples, the phase rotation adjustment component 1115 may identify one or more resource blocks allocated to the second wireless device, where the phase rotation adjustment is applied to the identified one or more resource blocks. In some examples, the phase rotation adjustment component 1115 may identify, based on the indication, a phase rotation adjustment for the signal, the phase rotation adjustment corresponding to a second carrier frequency that is different from the first carrier frequency. In some examples, the phase rotation adjustment component 1115 may apply, by the first device, the phase rotation adjustment to the signal. In some examples, the phase rotation adjustment component 1115 may apply the phase rotation adjustment to the signal prior to a transformation of the signal from a frequency-domain signal to a time-domain signal. In some examples, the phase rotation adjustment component 1115 may apply a phase rotation adjustment to the signal based on the configuration.

The transmission component 1120 may transmit, to the second wireless device, the signal including the applied phase rotation adjustment. In some examples, the transmission component 1120 may transmit, to the third wireless device, the second signal including the applied second phase rotation adjustment. In some examples, the transmission component 1120 may transmit, to a second device, the signal comprising the applied phase rotation adjustment. In some cases, the transmission component 1120 may retransmit, to a third device (e.g., a base station 105 or a UE 115), the signal including the applied phase rotation adjustment, the signal being retransmitted at a second carrier frequency.

The configuration determination component 1125 may determine a configuration of a wireless repeater that is between the first wireless device and the second wireless device, where the phase rotation adjustment is based on the configuration of the wireless repeater. In some cases, the configuration of the wireless repeater includes a frequency translation from the first carrier frequency to the second carrier frequency, and where the phase rotation adjustment is applied based on the frequency translation. In some examples, the configuration determination component 1125 may receive, from a second device (e.g., a UE 115 or a base station 105), a configuration of a phase rotation.

Figure 12:
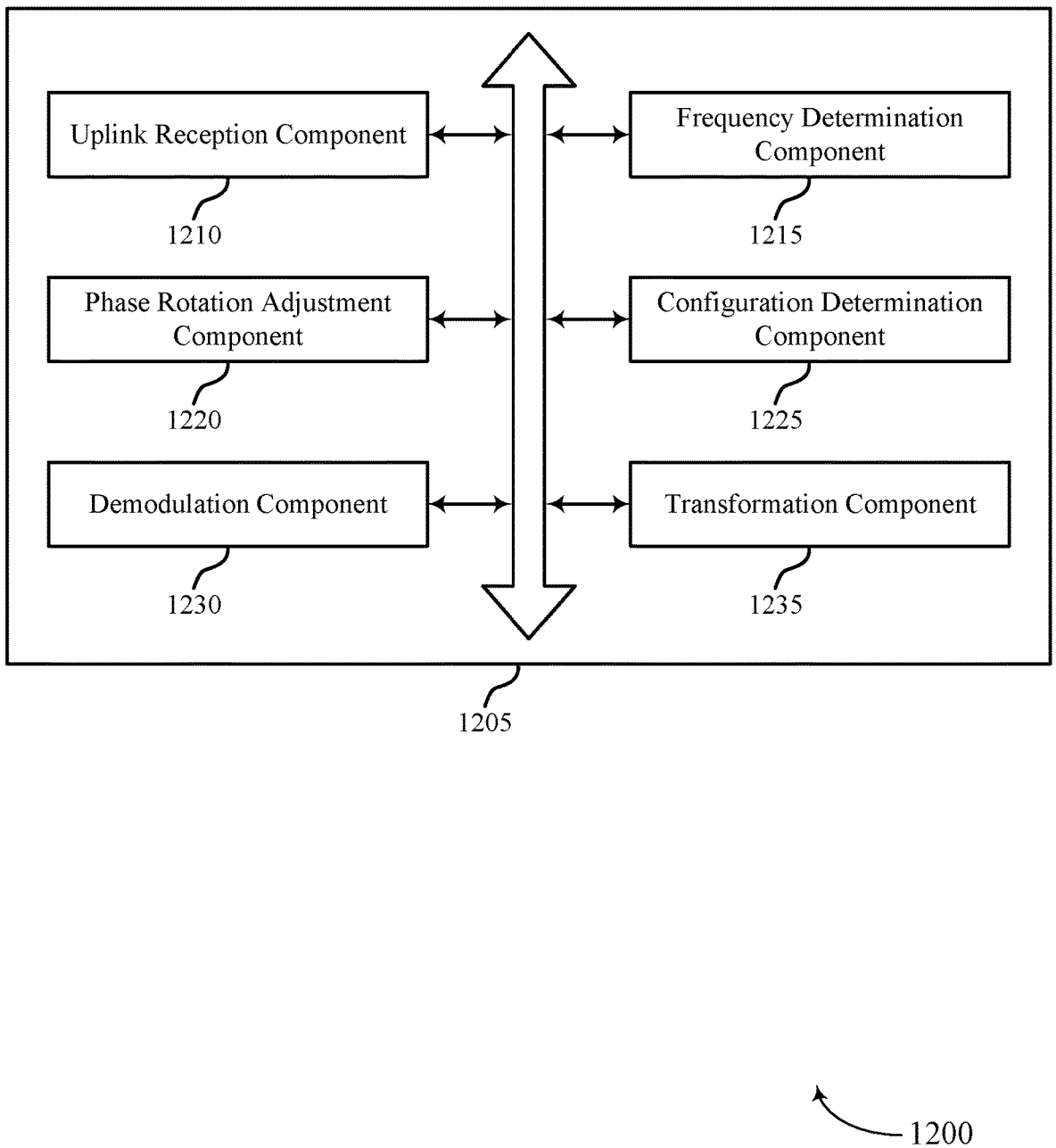

FIG. 12 shows a block diagram 1200 of a phase rotation manager 1205 that supports techniques for phase rotation correction in accordance with one or more aspects of the present disclosure. The phase rotation manager 1205 may be an example of aspects of a phase rotation manager 615, a phase rotation manager 815, a phase rotation manager 915, or a phase rotation manager 1410 described herein. The phase rotation manager 1205 may include an uplink reception component 1210, a frequency determination component 1215, a phase rotation adjustment component 1220, a configuration determination component 1225, a demodulation component 1230, and a transformation component 1235. Each of these modules may communicate, directly or indirectly, with one another (e.g., via one or more buses).

The uplink reception component 1210 may receive, from a UE 115, a signal on a first carrier frequency. In some examples, the uplink reception component 1210 may receive the signal from the UE 115 via a wireless repeater operating at the first carrier frequency. In some cases, the uplink reception component 1210 may receive, from the UE 115, the signal on a second carrier frequency that is different from the first carrier frequency.

The frequency determination component 1215 may determine that the signal was transmitted by the UE 115 at a second carrier frequency that is different from the first carrier frequency. In some cases, the frequency determination component 1215 may transmit an indication to a UE 115 that indicates a first carrier frequency for transmitting a signal.

The phase rotation adjustment component 1220 may apply a phase rotation adjustment to the signal based on the determination, the phase rotation adjustment corresponding to the second carrier frequency. In some examples, the phase rotation adjustment component 1220 may identify the phase rotation adjustment from a phase rotation adjustment table including a set of carrier frequencies that are different from the first carrier frequency, each carrier frequency of the set corresponding to a respective phase rotation adjustment. In some cases, the phase rotation adjustment component 1220 may apply a phase rotation adjustment to the received signal based on receiving the signal on the second carrier frequency.

The configuration determination component 1225 may determine a configuration of the wireless repeater, where the phase rotation adjustment is based on the configuration of the wireless repeater. In some cases, the configuration of the wireless repeater includes a frequency translation from the second carrier frequency to the first carrier frequency, and where the phase rotation adjustment is applied based on the frequency translation.

The demodulation component 1230 may demodulate the signal. The transformation component 1235 may transform the demodulated signal from a time-domain signal to a frequency-domain signal, where the phase rotation adjustment is applied after the transformation.

Figure 13:
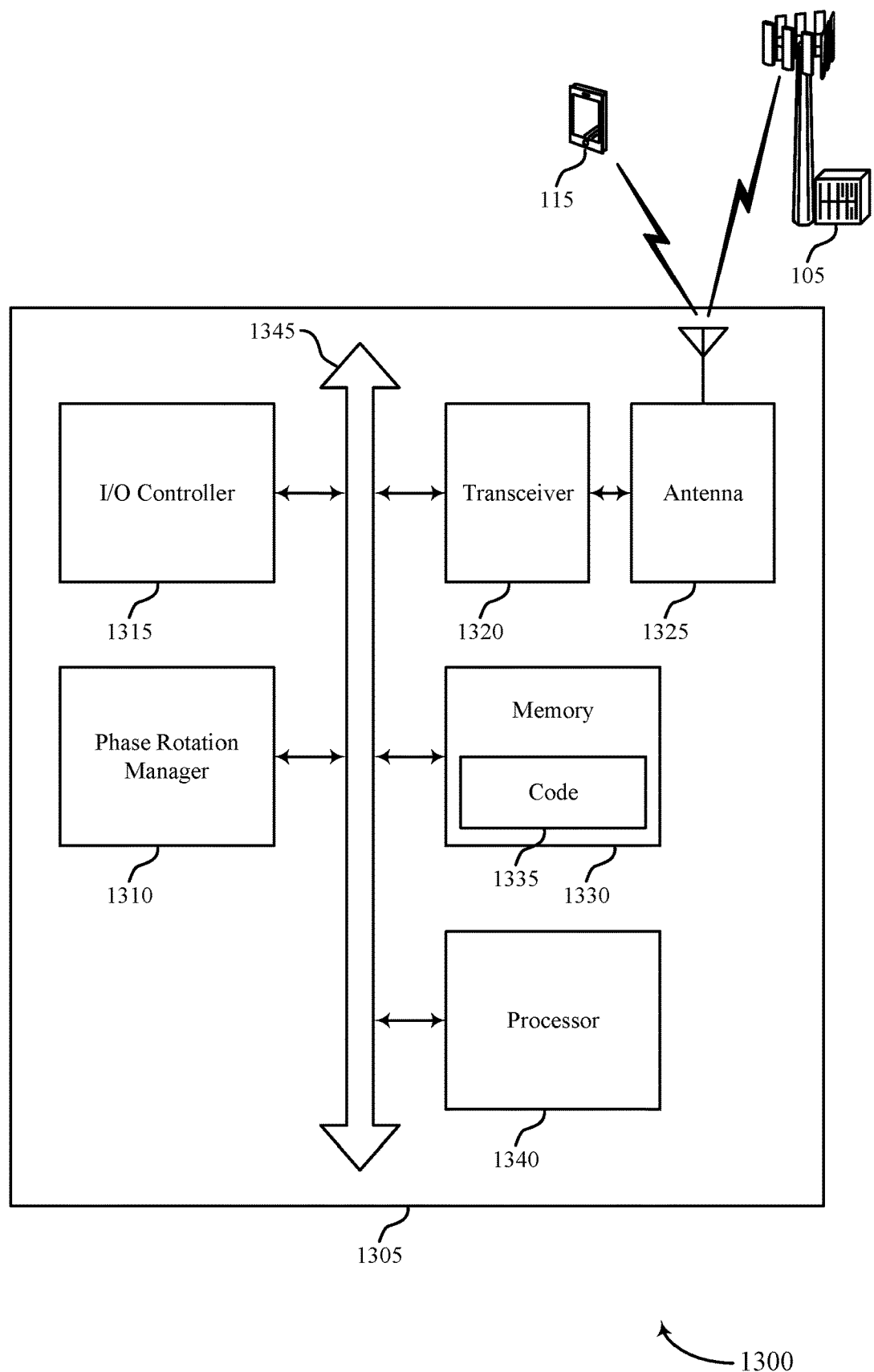
FIG. 13 shows a diagram of a system including a device that supports techniques for phase rotation correction in accordance with one or more aspects of the present disclosure.

FIG. 13 shows a diagram of a system 1300 including a device 1305 that supports techniques for phase rotation correction in accordance with one or more aspects of the present disclosure. The device 1305 may be an example of or include the components of device 605, device 705, device 805, or a wireless device, such as a UE 115, as described herein. The device 1305 may include components for bi-directional voice and data communications including components for transmitting and receiving communications, including a phase rotation manager 1310, an I/O controller 1315, a transceiver 1320, an antenna 1325, memory 1330, and a processor 1340. These components may be in electronic communication via one or more buses (e.g., bus 1345).

The phase rotation manager 1310 may determine that a transmission of a signal at a first carrier frequency will be received by a second wireless device at a second carrier frequency that is different from the first carrier frequency, identify, based on the determination, a phase rotation adjustment for the signal, the phase rotation adjustment corresponding to the second carrier frequency, apply, by the first wireless device, the phase rotation adjustment to the signal, and transmit, to the second wireless device, the signal including the applied phase rotation adjustment.

The phase rotation manager 1310 may also receive, from a base station 105, a signal on a first carrier frequency, determine that the signal was transmitted by the base station 105 at a second carrier frequency that is different from the first carrier frequency, and apply a phase rotation adjustment to the signal based on the determination, the phase rotation adjustment corresponding to the first carrier frequency.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases, the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for phase rotation correction).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may, for example, apply a phase rotation adjustment to a signal. This phase rotation adjustment may ensure that signals communicated between UEs 115 and base station 105 may have minimal errors and be less dependent on the size of the corresponding FFT of the location of the RF LO. The phase rotation applied by the processor may also ensure compliance with some wireless communications standards.

Figure 14:
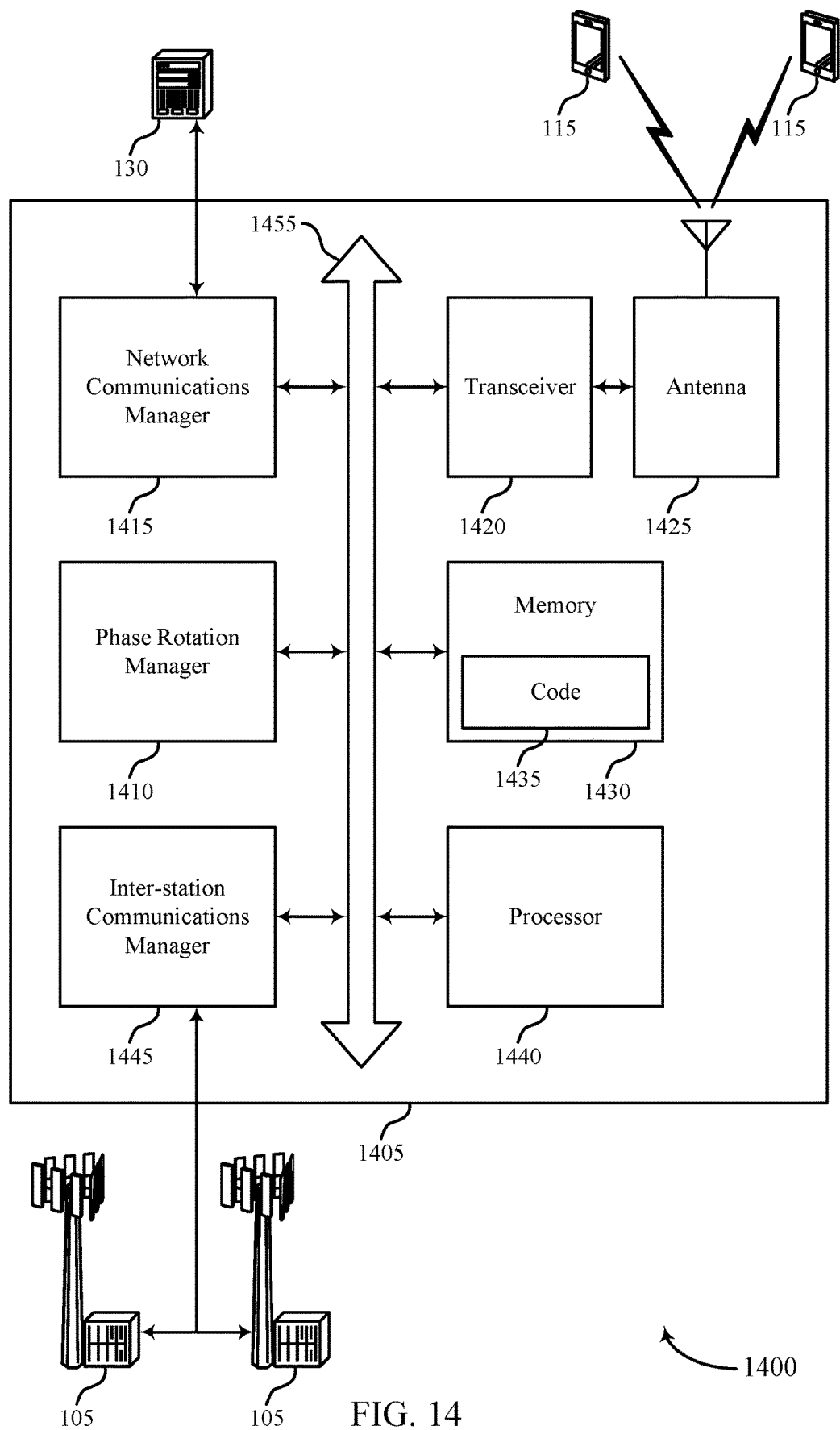
FIG. 14 shows a diagram of a system including a base station that supports techniques for phase rotation correction in accordance with one or more aspects of the present disclosure.

FIG. 14 shows a diagram of a system 1400 including a device 1405 that supports techniques for phase rotation correction in accordance with one or more aspects of the present disclosure. The device 1405 may be an example of or include the components of device 605, a device 805, a device 905, or a wireless device, such as a base station 105, as described herein. The device 1405 may include components for bi-directional voice and data communications including components for transmitting and receiving communications, including a phase rotation manager 1410, a network communications manager 1450, a transceiver 1420, an antenna 1425, memory 1430, a processor 1440, and an inter-station communications manager 1455. These components may be in electronic communication via one or more buses (e.g., bus 1445).

The phase rotation manager 1410 may determine that a transmission of a signal at a first carrier frequency will be received by a second wireless device at a second carrier frequency that is different from the first carrier frequency, identify, based on the determination, a phase rotation adjustment for the signal, the phase rotation adjustment corresponding to the second carrier frequency, apply, by the first wireless device, the phase rotation adjustment to the signal, and transmit, to the second wireless device, the signal including the applied phase rotation adjustment. In some cases, the phase rotation manager 1410 may transmit an indication to a second device that indicates a first carrier frequency for receiving a signal, identify, based at least in part on the indication, a phase rotation adjustment for the signal, the phase rotation adjustment corresponding to a second carrier frequency that is different from the first carrier frequency, apply, by the first device, the phase rotation adjustment to the signal, and transmit, to the second device, the signal comprising the applied phase rotation adjustment.

The phase rotation manager 1410 may also receive, from a UE 115, a signal on a first carrier frequency, determine that the signal was transmitted by the UE 115 at a second carrier frequency that is different from the first carrier frequency, and apply a phase rotation adjustment to the signal based on the determination, the phase rotation adjustment corresponding to the second carrier frequency. In some examples, the phase rotation manager may transmit an indication to a UE that indicates a first carrier frequency for transmitting a signal, receive, from the UE, the signal on a second carrier frequency that is different from the first carrier frequency, and apply a phase rotation adjustment to the signal based at least in part on receiving the signal on the second carrier frequency, the phase rotation adjustment corresponding to the second carrier frequency.

Network communications manager 1450 may manage communications with the core network (e.g., via one or more wired backhaul links). For example, the network communications manager 1450 may manage the transfer of data communications for client devices, such as one or more UEs 115.

Transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases, the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for phase rotation correction).

Inter-station communications manager 1455 may manage communications with other base station 105, and may include a controller or scheduler for controlling communications with UEs 115 in cooperation with other base stations 105. For example, the inter-station communications manager 1455 may coordinate scheduling for transmissions to UEs 115 for various interference mitigation techniques such as beamforming or joint transmission. In some examples, inter-station communications manager 1455 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
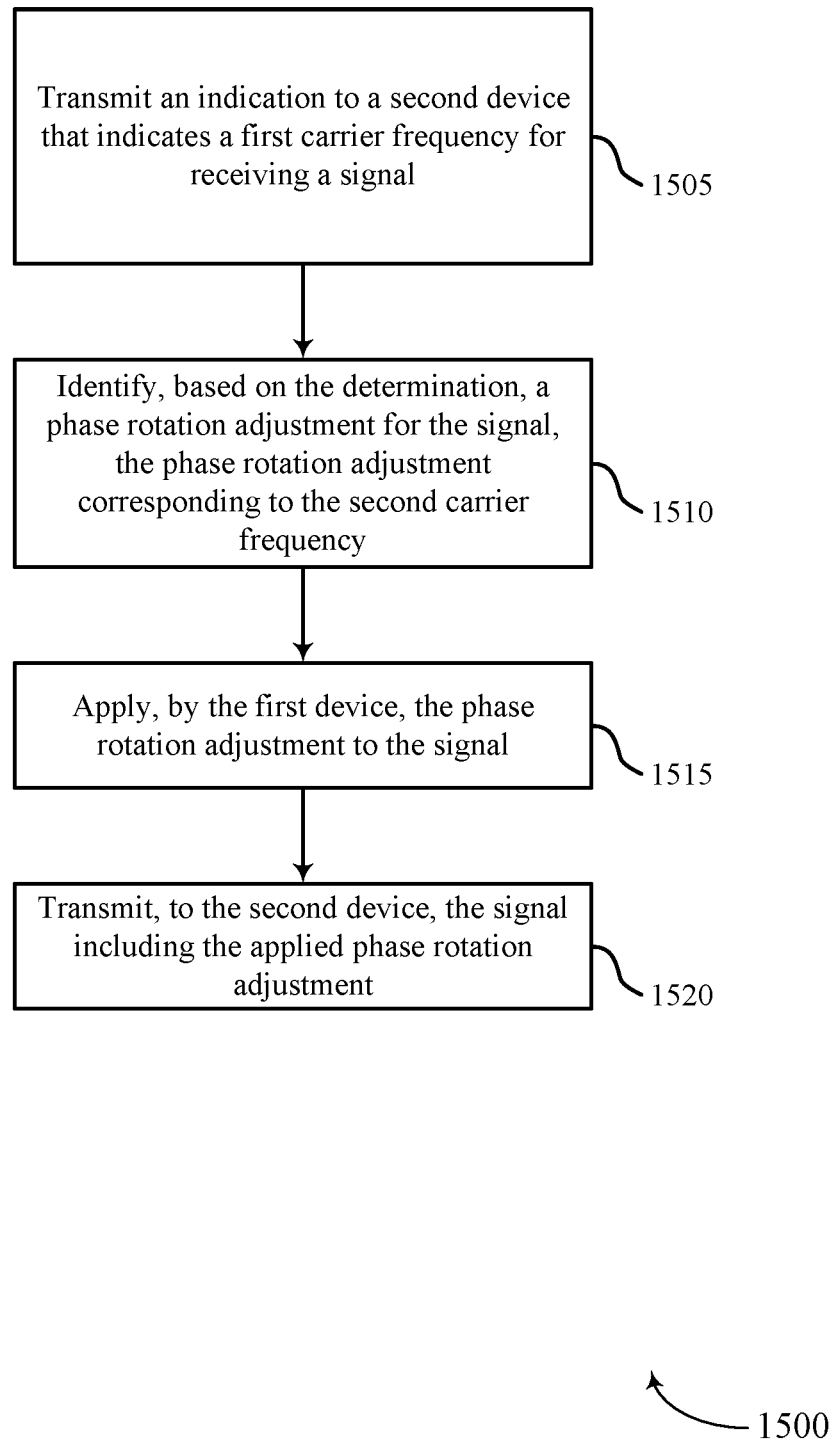
FIGS. 15 through 19 show flowcharts illustrating methods that support techniques for phase rotation correction in accordance with one or more aspects of the present disclosure.

FIG. 15 shows a flowchart illustrating a method 1500 that supports techniques for phase rotation correction in accordance with one or more aspects of the present disclosure. The operations of method 1500 may be implemented by a device in a wireless network, such as a UE 115 or base station 105, or its components as described herein. For example, the operations of method 1500 may be performed by a phase rotation manager as described with reference to FIGS. 6, 7, 8, 10, and 11. In some examples, a UE 115 or base station 105 may execute a set of instructions to control the functional elements of the UE 115 or base station 105 to perform the functions described herein. Additionally or alternatively, a UE 115 or base station 105 may perform aspects of the functions described herein using special-purpose hardware.

At 1505, the UE 115 or base station 105 may transmit an indication to a second device that indicates a first carrier frequency for receiving a signal. The operations of 1505 may be performed according to the methods described herein. In some examples, aspects of the operations of 1505 may be performed by a frequency determination component as described with reference to FIGS. 7, 8, 10, and 11.

At 1510, the UE 115 or base station 105 may identify, based on the indication, a phase rotation adjustment for the signal, the phase rotation adjustment corresponding to a second carrier frequency that is different from the first carrier frequency. The operations of 1510 may be performed according to the methods described herein. In some examples, aspects of the operations of 1510 may be performed by a phase rotation adjustment component as described with reference to FIGS. 7, 8, 10, and 11.

At 1515, the UE 115 or base station 105 may apply, by the first device, the phase rotation adjustment to the signal. The operations of 1515 may be performed according to the methods described herein. In some examples, aspects of the operations of 1515 may be performed by a phase rotation adjustment component as described with reference to FIGS. 7, 8, 10, and 11.

At 1520, the UE 115 or base station 105 may transmit, to the second device, the signal comprising the applied phase rotation adjustment. The operations of 1520 may be performed according to the methods described herein. In some examples, aspects of the operations of 1520 may be performed by a transmission component as described with reference to FIGS. 8 and 11.

Figure 16:
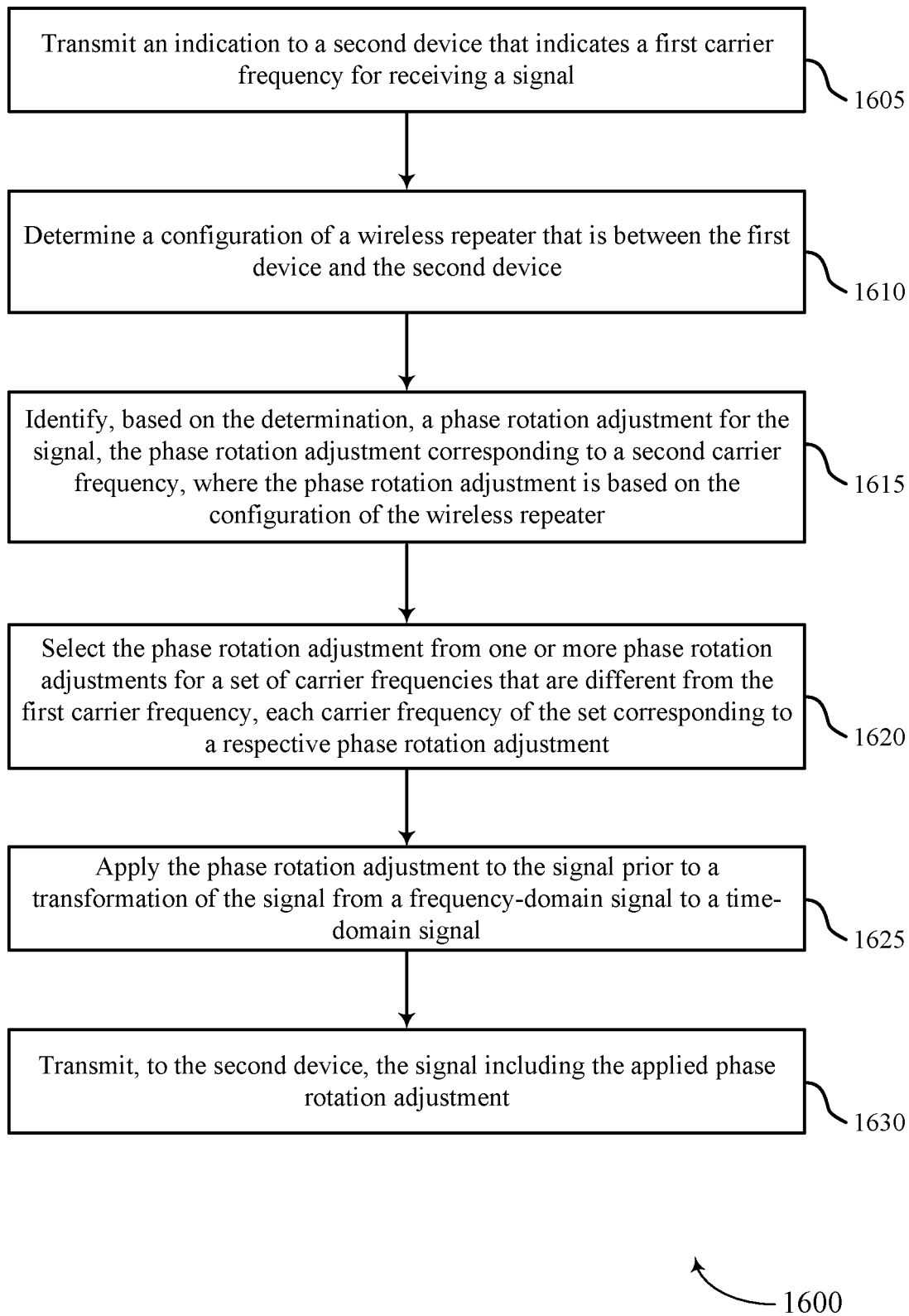

FIG. 16 shows a flowchart illustrating a method 1600 that supports techniques for phase rotation correction in accordance with one or more aspects of the present disclosure. The operations of method 1600 may be implemented by a wireless device, such as a UE 115 or base station 105, or its components as described herein. For example, the operations of method 1600 may be performed by a phase rotation manager as described with reference to FIGS. 6, 7, 8, 10, and 11. In some examples, a UE 115 or base station 105 may execute a set of instructions to control the functional elements of the UE 115 or base station 105 to perform the functions described herein. Additionally or alternatively, a UE 115 or base station 105 may perform aspects of the functions described herein using special-purpose hardware.

At 1605, the UE 115 or base station 105 may transmit an indication to a second device that indicates a first carrier frequency for receiving a signal. The operations of 1605 may be performed according to the methods described herein. In some examples, aspects of the operations of 1605 may be performed by a frequency determination component as described with reference to FIGS. 7, 8, 10, and 11.

At 1610, the UE 115 or base station 105 may determine a configuration of a wireless repeater that is between the first device and the second device. The operations of 1610 may be performed according to the methods described herein. In some examples, aspects of the operations of 1610 may be performed by a configuration determination component as described with reference to FIG. 11.

At 1615, the UE 115 or base station 105 may identify, based on the determination, a phase rotation adjustment for the signal, the phase rotation adjustment corresponding to the second carrier frequency, where the phase rotation adjustment may be based on the configuration of the wireless repeater. The operations of 1615 may be performed according to the methods described herein. In some examples, aspects of the operations of 1615 may be performed by a phase rotation adjustment component as described with reference to FIGS. 7, 8, 10, and 11.

At 1620, the UE 115 or base station 105 may select the phase rotation adjustment from one or more phase rotation adjustments for a plurality of carrier frequencies that are different from the first carrier frequency, each carrier frequency of the set corresponding to a respective phase rotation adjustment. The operations of 1620 may be performed according to the methods described herein. In some examples, aspects of the operations of 1620 may be performed by a phase rotation adjustment component as described with reference to FIGS. 7, 8, 10, and 11.

At 1625, the UE 115 or base station 105 may apply the phase rotation adjustment to the signal prior to a transformation of the signal from a frequency-domain signal to a time-domain signal. The operations of 1625 may be performed according to the methods described herein. In some examples, aspects of the operations of 1625 may be performed by a phase rotation adjustment component as described with reference to FIGS. 7, 8, 10, and 11.

At 1630, the UE 115 or base station 105 may transmit, to the second device, the signal including the applied phase rotation adjustment. The operations of 1630 may be performed according to the methods described herein. In some examples, aspects of the operations of 1630 may be performed by a transmission component as described with reference to FIGS. 8 and 11.

Figure 17:
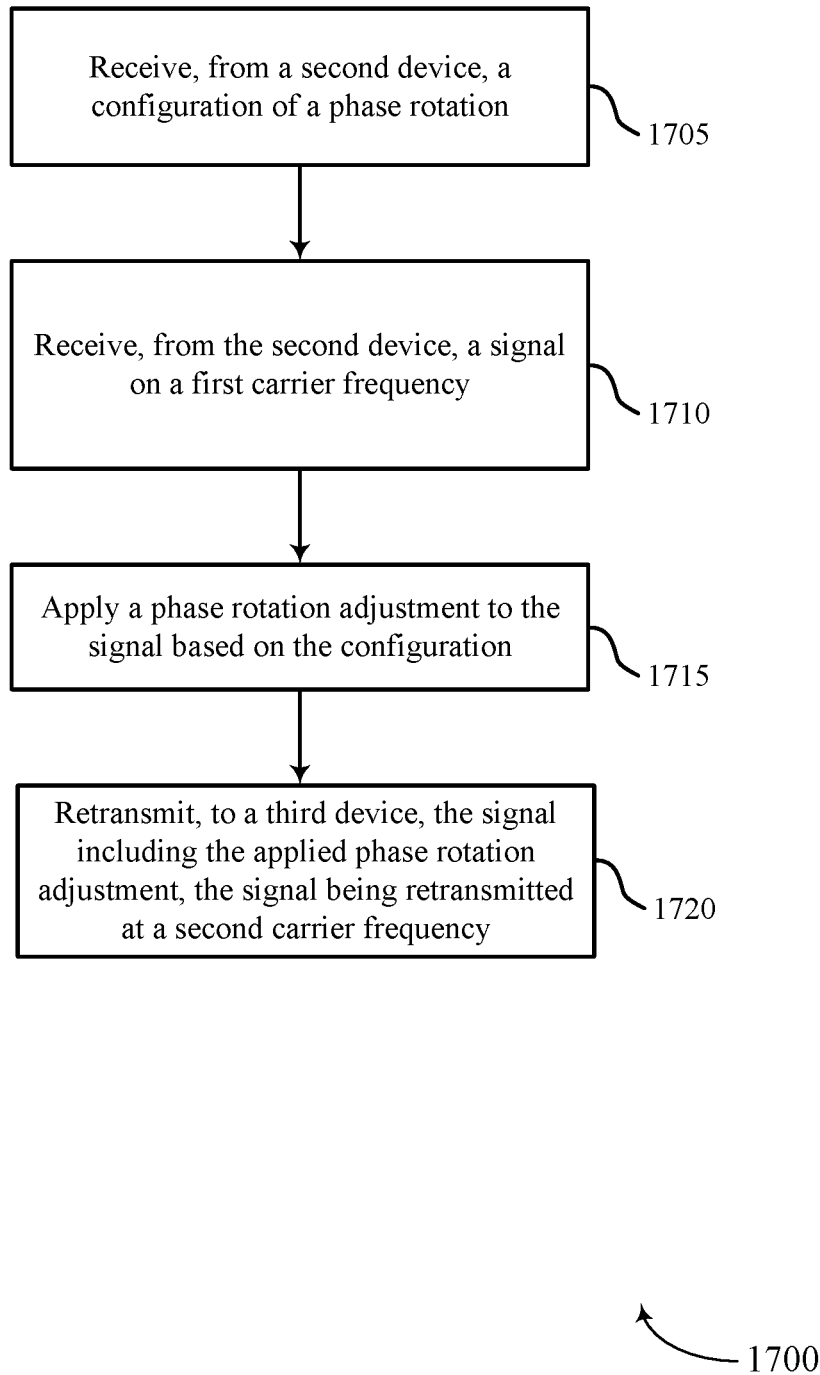

FIG. 17 shows a flowchart illustrating a method 1700 that supports techniques for phase rotation correction in accordance with one or more aspects of the present disclosure. The operations of method 1700 may be implemented by a first device, such as wireless repeater (e.g., a repeater 140, 215, 315), or its components as described herein. For example, the operations of method 1700 may be performed by a phase rotation manager as described with reference to FIGS. 6, 7, 8, 10, and 11. In some examples, a wireless repeater may execute a set of instructions to control the functional elements of the wireless repeater to perform the functions described herein. Additionally or alternatively, wireless repeater may perform aspects of the functions described herein using special-purpose hardware.

At 1705, the wireless repeater may receive, from a second device (e.g., a UE 115 or a base station 105), a configuration of a phase rotation. The operations of 1705 may be performed according to the methods described herein. In some examples, aspects of the operations of 1705 may be performed by a configuration determination component as described with reference to FIG. 11.

At 1710, the wireless repeater may receive, from the second device, a signal on a first carrier frequency. The operations of 1710 may be performed according to the methods described herein. In some examples, aspects of the operations of 1710 may be performed by a downlink reception component as described with reference to FIGS. 7 and 10.

At 1715, the wireless repeater may apply a phase rotation adjustment to the signal based on the configuration. The operations of 1715 may be performed according to the methods described herein. In some examples, aspects of the operations of 1715 may be performed by a phase rotation adjustment component as described with reference to FIGS. 7, 8, 10, and 11.

At 1720, the wireless repeater may retransmit, to a third device (e.g., a base station 105 or a UE 115), the signal including the applied phase rotation adjustment, the signal being retransmitted at a second carrier frequency. The operations of 1720 may be performed according to the methods described herein. In some examples, aspects of the operations of 1720 may be performed by a transmission component as described with reference to FIGS. 8 and 11.

Figure 18:
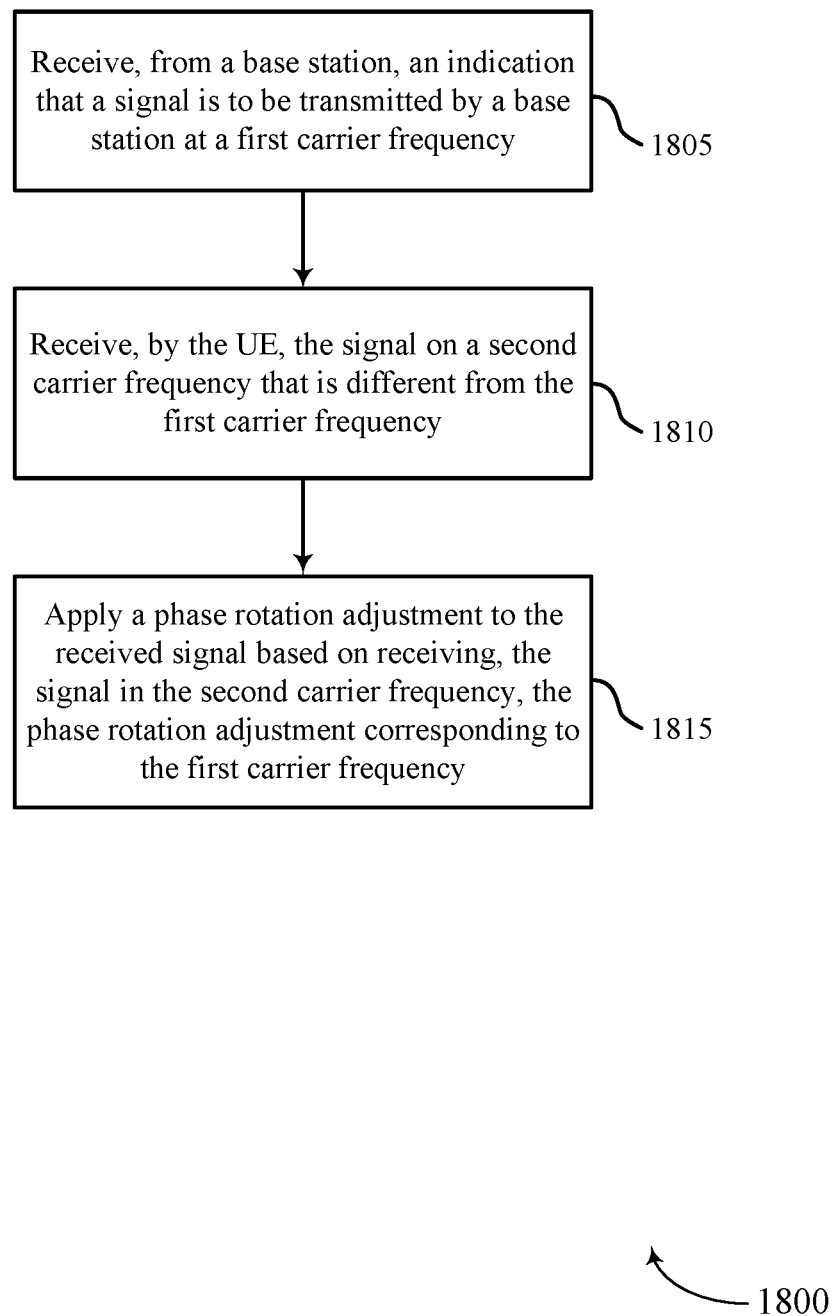

FIG. 18 shows a flowchart illustrating a method 1800 that supports techniques for phase rotation correction in accordance with one or more aspects of the present disclosure. The operations of method 1800 may be implemented by a UE 115 or its components as described herein. For example, the operations of method 1800 may be performed by a phase rotation manager as described with reference to FIGS. 6, 7, 8, 10, and 11. In some examples, a UE 115 may execute a set of instructions to control the functional elements of the UE 115 to perform the functions described herein. Additionally or alternatively, a UE 115 may perform aspects of the functions described herein using special-purpose hardware.

At 1805, the UE 115 may receive, from a base station 105, an indication that a signal is to be transmitted by a base station 105 at a first carrier frequency. The operations of 1805 may be performed according to the methods described herein. In some examples, aspects of the operations of 1805 may be performed by a frequency determination component as described with reference to FIG. 11.

At 1810, the UE 115 may receive a signal on a second carrier frequency that is different from the first carrier frequency. The operations of 1810 may be performed according to the methods described herein. In some examples, aspects of the operations of 1810 may be performed by a downlink reception component as described with reference to FIGS. 7 and 10.

At 1815, the UE 115 may apply a phase rotation adjustment to the received signal based on receiving the signal on the second carrier frequency, the phase rotation adjustment corresponding to the first carrier frequency. The operations of 1815 may be performed according to the methods described herein. In some examples, aspects of the operations of 1815 may be performed by a phase rotation adjustment component as described with reference to FIGS. 7, 8, 10, and 11.

Figure 19:
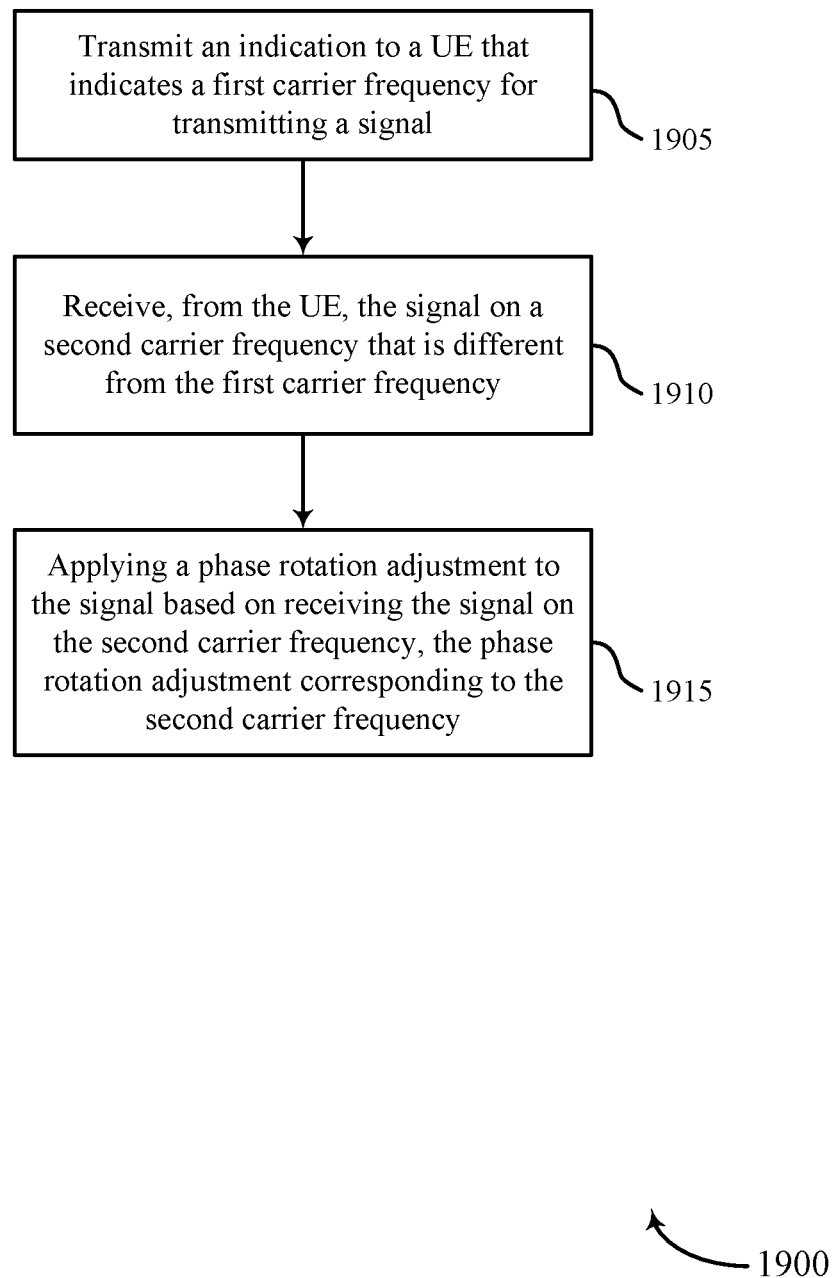

FIG. 19 shows a flowchart illustrating a method 1900 that supports techniques for phase rotation correction in accordance with one or more aspects of the present disclosure. The operations of method 1900 may be implemented by a base station 105 or its components as described herein. For example, the operations of method 1900 may be performed by a phase rotation manager as described with reference to FIGS. 6, 8, 9, and 11. In some examples, a base station 105 may execute a set of instructions to control the functional elements of the base station 105 to perform the functions described herein. Additionally or alternatively, a base station 105 may perform aspects of the functions described herein using special-purpose hardware.

At 1905, the base station 105 may transmit an indication to a UE 115 that indicates a first carrier frequency for transmitting a signal. The operations of 1905 may be performed according to the methods described herein. In some examples, aspects of the operations of 1905 may be performed by a frequency determination component as described with reference to FIGS. 8, 9, 11, and 12.

At 1910, the base station 105 may receive, from the UE 115, the signal on a second carrier frequency that is different from the first carrier frequency. The operations of 1910 may be performed according to the methods described herein. In some examples, aspects of the operations of 1910 may be performed by an uplink reception component as described with reference to FIGS. 9 and 12.

At 1915, the base station 105 may apply a phase rotation adjustment to the received signal based on receiving the signal on the second carrier frequency, the phase rotation adjustment corresponding to the second carrier frequency. The operations of 1915 may be performed according to the methods described herein. In some examples, aspects of the operations of 1915 may be performed by a phase rotation adjustment component as described with reference to FIGS. 8, 9, 11, and 12.

The following provides an overview of examples of the present disclosure:

Example 1: A method for wireless communications at a first device in a wireless network, comprising: transmitting an indication to a second device that indicates a first carrier frequency for receiving a signal; identifying, based at least in part on the indication, a phase rotation adjustment for the signal, the phase rotation adjustment corresponding to a second carrier frequency that is different from the first carrier frequency; applying, by the first device, the phase rotation adjustment to the signal; and transmitting, to the second device, the signal comprising the applied phase rotation adjustment.

Example 2: The method of example 1, further comprising: determining a configuration of a wireless repeater that is between the first device and the second device, wherein the phase rotation adjustment is based at least in part on the configuration of the wireless repeater.

Example 3: The method of any one of examples 1 and 2, wherein the configuration of the wireless repeater comprises a frequency translation from the first carrier frequency to the second carrier frequency, and wherein the phase rotation adjustment is applied based at least in part on the frequency translation.

Example 4: The method of any one of examples 1 through 3, wherein identifying the phase rotation adjustment comprises selecting the phase rotation adjustment from one or more phase rotation adjustments for a plurality of carrier frequencies that are different from the first carrier frequency, each carrier frequency of the plurality corresponding to a respective phase rotation adjustment.

Example 5: The method of any one of examples 1 through 4, further comprising identifying the one or more phase rotation adjustments using a phase rotation adjustment table.

Example 6: The method of any one of examples 1 through 5, wherein applying the phase rotation adjustment comprises applying the phase rotation adjustment to the signal based at least in part on respective indexes of one or more symbol periods, wherein the phase rotation adjustment applied to the signal for transmission during the one or more symbol periods is calculated based at least in part on the respective indexes.

Example 7: The method of any one of examples 1 through 6, further comprising: determining that a transmission of a second signal at the first carrier frequency will be received by a third device at a third carrier frequency that is different from the first carrier frequency; identifying a second phase rotation adjustment for the second signal, the second phase rotation adjustment corresponding to the third carrier frequency; applying the second phase rotation adjustment to the second signal; and transmitting, to the third device, the second signal comprising the applied second phase rotation adjustment.

Example 8: The method of any one of examples 1 through 7, further comprising applying the phase rotation adjustment to the signal and the second phase rotation adjustment to the second signal for a same symbol period.

Example 9: The method of any one of examples 1 through 8, further comprising: identifying one or more resource blocks allocated to the second device, wherein the phase rotation adjustment is applied to the identified one or more resource blocks.

Example 10: The method of any one of examples 1 through 9, wherein applying the phase rotation adjustment comprises: applying the phase rotation adjustment to the signal prior to a transformation of the signal from a frequency-domain signal to a time-domain signal.

Example 11: The method of any one of examples 1 through 10, wherein the phase rotation adjustment is determined in accordance with an equation comprising $e^{-j2\pi f_n(t_{start,l}^\mu + N_{CP,l}^\mu T^c)}$, wherein: $t_{start,l}^\mu$ comprises a starting position of a symbol l for a subcarrier spacing configuration p in a subframe; $N_{CP,l}^\mu$ comprises a cyclic prefix length in samples for the symbol l; and $T_c$ comprises a sampling interval in a baseband.

Example 12: A method for wireless communications at a first device in a wireless network, comprising: receiving, from a second device, a configuration of a phase rotation; receiving, from the second device, a signal on a first carrier frequency; applying a phase rotation adjustment to the signal based at least in part on the configuration; and retransmitting, to a third device, the signal comprising the applied phase rotation adjustment, the signal being retransmitted at a second carrier frequency.

Example 13: The method of example 12, wherein applying the phase rotation adjustment to the signal comprises: applying the phase rotation adjustment to the signal based at least in part on respective indexes of one or more symbol periods, wherein the phase rotation adjustment applied to the signal received during the one or more symbol periods is calculated based at least in part on the respective indexes.

Example 14: The method of any of examples 12 or 13, further comprising: identifying the phase rotation adjustment from a phase rotation adjustment table including a plurality of carrier frequencies that are different from the first carrier frequency, each carrier frequency of the plurality corresponding to a respective phase rotation adjustment.

Example 15: The method of any one of examples 12 through 14, wherein applying the phase rotation adjustment to the signal comprises applying the phase rotation adjustment to the signal based at least in part on respective indexes of one or more symbol periods, wherein the phase rotation adjustment applied to the signal received during the one or more symbol periods is calculated based at least in part on the respective indexes.

Example 16: The method of any one of examples 12 through 15, determining the phase rotation adjustment in accordance with an equation comprising $e^{-j2\pi f_n(t_{start,l}^\mu + N_{CP,l}^\mu T^c)}$, wherein: $t_{start,l}^\mu$ comprises a starting position of a symbol l for a subcarrier spacing configuration μ in a subframe; $N_{CP,l}^\mu$ comprises a cyclic prefix length in samples for the symbol l; and $T_c$ comprises a sampling interval in a baseband.

Example 17: The method of any one of examples 12 through 16, wherein the first carrier frequency is different from the second carrier frequency.

Example 18: The method of any one of examples 12 through 17, wherein the first device is a wireless repeater.

Example 19: The method of any one of examples 12 through 18, wherein the second device is a base station or a user equipment (UE), and wherein the third device is a base station or a UE.

Example 20: A method for wireless communications at a user equipment (UE), comprising: receiving an indication that a signal is to be transmitted by a base station at a first carrier frequency; receiving, by the UE, the signal on a second carrier frequency that is different from the first carrier frequency; and applying a phase rotation adjustment to the received signal based at least in part on receiving the signal on the second carrier frequency, the phase rotation adjustment corresponding to the first carrier frequency.

Example 21: The method of example 20, wherein receiving the signal from the base station comprises receiving the signal from the base station via a wireless repeater operating at the second carrier frequency.

Example 22: The method of any of example 20 or 21, further comprising: identifying the phase rotation adjustment from a phase rotation adjustment table including a plurality of carrier frequencies that are different from the first carrier frequency, each carrier frequency of the plurality corresponding to a respective phase rotation adjustment.

Example 23: The method of any of example 20 through 22, wherein applying the phase rotation adjustment to the signal comprises: applying the phase rotation adjustment to the signal based at least in part on respective indexes of one or more symbol periods, wherein the phase rotation adjustment applied to the signal received during the one or more symbol periods is calculated based at least in part on the respective indexes.

Example 24: The method of any of example 20 through 23, further comprising: demodulating the signal; and transforming the demodulated signal from a time-domain signal to a frequency-domain signal, wherein the phase rotation adjustment is applied after the transformation.

Example 25: A method for wireless communications at a base station, comprising: transmitting an indication to a user equipment (UE) that indicates a first carrier frequency for transmitting a signal; receiving, from the UE, a signal on a second carrier frequency that is different from the first carrier frequency; and applying a phase rotation adjustment to the signal based at least in part on the received signal, the phase rotation adjustment corresponding to the second carrier frequency.

Example 26: The method of example 25, wherein receiving the signal from the UE comprises: receiving the signal from the UE via a wireless repeater operating at the second carrier frequency.

Example 27: The method of any of examples 25 and 26, further comprising: determining a configuration of the wireless repeater, wherein the phase rotation adjustment is based at least in part on the configuration of the wireless repeater.

Example 28: The method of any of examples 25 through 27, wherein the configuration of the wireless repeater comprises a frequency translation from the first carrier frequency to the second carrier frequency, and wherein the phase rotation adjustment is applied based at least in part on the frequency translation.

Example 29: The method of any of examples 25 through 28, further comprising: identifying the phase rotation adjustment from a phase rotation adjustment table including a plurality of carrier frequencies that are different from the first carrier frequency, each carrier frequency of the plurality corresponding to a respective phase rotation adjustment.

Example 30: The method of any of examples 25 through 29, further comprising: demodulating the signal; and transforming the demodulated signal from a time-domain signal to a frequency-domain signal, wherein the phase rotation adjustment is applied after the transformation.

Example 31: An apparatus for wireless communication comprising at least one means for performing a method of any one of examples 1 through 11.

Example 32: An apparatus for wireless communication comprising a processor, memory in electronic communication with the processor, and instructions stored in the memory and executable by the processor to cause the apparatus to perform a method of any one of examples 1 through 11.

Example 33: A non-transitory computer-readable medium storing code for wireless communication comprising a processor, memory in electronic communication with the processor, and instructions stored in the memory and executable by the processor to cause the apparatus to perform a method of any one of examples 1 through 11.

Example 34: An apparatus for wireless communication comprising at least one means for performing a method of any one of examples 12 through 19.

Example 35: An apparatus for wireless communication comprising a processor, memory in electronic communication with the processor, and instructions stored in the memory and executable by the processor to cause the apparatus to perform a method of any one of examples 12 through 19.

Example 36: A non-transitory computer-readable medium storing code for wireless communication comprising a processor, memory in electronic communication with the processor, and instructions stored in the memory and executable by the processor to cause the apparatus to perform a method of any one of examples 12 through 19.

Example 37: An apparatus for wireless communication comprising at least one means for performing a method of any one of examples 20 through 24.

Example 38: An apparatus for wireless communication comprising a processor, memory in electronic communication with the processor, and instructions stored in the memory and executable by the processor to cause the apparatus to perform a method of any one of examples 20 through 24.

Example 39: A non-transitory computer-readable medium storing code for wireless communication comprising a processor, memory in electronic communication with the processor, and instructions stored in the memory and executable by the processor to cause the apparatus to perform a method of any one of examples 20 through 24.

Example 40: An apparatus for wireless communication comprising at least one means for performing a method of any one of examples 25 through 30.

Example 41: An apparatus for wireless communication comprising a processor, memory in electronic communication with the processor, and instructions stored in the memory and executable by the processor to cause the apparatus to perform a method of any one of examples 25 through 30.

Example 42: A non-transitory computer-readable medium storing code for wireless communication comprising a processor, memory in electronic communication with the processor, and instructions stored in the memory and executable by the processor to cause the apparatus to perform a method of any one of examples 25 through 30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device in a wireless network, comprising:
    transmitting, by the first device, an indication to a second device that indicates a first carrier frequency for receiving a signal;
    applying, by the first device, a phase rotation adjustment to the signal based at least in part on transmitting the indication, the phase rotation adjustment corresponding to a second carrier frequency that is different from the first carrier frequency, and the phase rotation adjustment being based at least in part on a starting position of a symbol, a cyclic prefix length, a sampling interval, or any combination thereof; and
    transmitting, to the second device, the signal comprising the applied phase rotation adjustment.

2. The method of claim 1, further comprising:
    determining a configuration of a wireless repeater that is between the first device and the second device, wherein the phase rotation adjustment is based at least in part on the configuration of the wireless repeater.

3. The method of claim 2, wherein the configuration of the wireless repeater comprises a frequency translation from the first carrier frequency to the second carrier frequency, and wherein the phase rotation adjustment is applied based at least in part on the frequency translation.

4. The method of claim 1, further comprising:
    selecting the phase rotation adjustment from one or more phase rotation adjustments for a plurality of carrier frequencies that are different from the first carrier frequency, each carrier frequency of the plurality of carrier frequencies corresponding to a respective phase rotation adjustment.

5. The method of claim 4, further comprising:
    identifying the one or more phase rotation adjustments using a phase rotation adjustment table.

6. The method of claim 1, the applying comprising:
    applying the phase rotation adjustment to the signal based at least in part on respective indexes of one or more symbol periods, wherein the phase rotation adjustment applied to the signal for transmission during the one or more symbol periods is calculated based at least in part on the respective indexes.

7. The method of claim 1, further comprising:
    determining that a transmission of a second signal at the first carrier frequency will be received by a third device at a third carrier frequency that is different from the first carrier frequency;
    identifying a second phase rotation adjustment for the second signal, the second phase rotation adjustment corresponding to the third carrier frequency;
    applying the second phase rotation adjustment to the second signal; and
    transmitting, to the third device, the second signal comprising the applied second phase rotation adjustment.

8. The method of claim 7, further comprising:
    applying the phase rotation adjustment to the signal and the second phase rotation adjustment to the second signal for a same symbol period.

9. The method of claim 1, further comprising:
    identifying one or more resource blocks allocated to the second device, wherein the phase rotation adjustment is applied to the identified one or more resource blocks.

10. The method of claim 1, the applying comprising:
    applying the phase rotation adjustment to the signal prior to a transformation of the signal from a frequency-domain signal to a time-domain signal.

11. The method of claim 1, wherein the phase rotation adjustment is determined in accordance with an equation comprising $e^{-j2\pi f_n(t_{start,l}^\mu + N_{CP,l}^\mu T^c)}$, wherein:
    $t_{start,l}^\mu$ comprises the starting position of the symbol, the symbol comprising a symbol period l for a subcarrier spacing configuration $\mu$ in a subframe;
    $N_{CP,l}^\mu$ comprises the cyclic prefix length in samples for the symbol period l; and
    $T_c$ comprises the sampling interval in a baseband.

12. The method of claim 1, wherein the phase rotation adjustment is based at least in part on two or more of the starting position of the symbol, the cyclic prefix length, or the sampling interval.

13. The method of claim 1, wherein the phase rotation adjustment is based at least in part on the starting position of the symbol, the cyclic prefix length, and the sampling interval.

14. A method for wireless communications at a first device in a wireless network, comprising:
receiving, from a second device, a configuration of a phase rotation;
receiving, from the second device, a signal on a first carrier frequency;
applying a phase rotation adjustment to the signal based at least in part on the configuration, the phase rotation adjustment being based at least in part on a starting position of a symbol, a cyclic prefix length, a sampling interval, or any combination thereof; and
retransmitting, to a third device, the signal comprising the applied phase rotation adjustment, the signal being retransmitted at a second carrier frequency.

15. The method of claim 14, the applying comprising:
applying the phase rotation adjustment to the signal based at least in part on respective indexes of one or more symbol periods, wherein the phase rotation adjustment applied to the signal received during the one or more symbol periods is calculated based at least in part on the respective indexes.

16. The method of claim 14, further comprising:
identifying the phase rotation adjustment from a phase rotation adjustment table including a plurality of carrier frequencies that are different from the first carrier frequency, each carrier frequency of the plurality of carrier frequencies corresponding to a respective phase rotation adjustment.

17. The method of claim 14, the applying comprising:
applying the phase rotation adjustment to the signal prior to a transformation of the signal from a frequency-domain signal to a time-domain signal.

18. The method of claim 14, further comprising:
determining the phase rotation adjustment in accordance with an equation comprising $e^{-j2\pi f_n(t_{start,l}^{\mu} + N_{CP,l}^{\mu} T_c)}$, wherein:
$t_{start,l}^{\mu}$ comprises the starting position of the symbol, the symbol comprising a symbol period 1. for a subcarrier spacing configuration $\mu$ in a subframe;
$N_{CP,l}^{\mu}$ comprises the cyclic prefix length in samples for the symbol period l; and
$T_c$ comprises the sampling interval in a baseband.

19. The method of claim 14, wherein the first carrier frequency is different from the second carrier frequency.

20. The method of claim 14, wherein the first device is a wireless repeater.

21. The method of claim 20, wherein the second device is a network device or a user equipment (UE), and wherein the third device is a network device or a UE.

22. The method of claim 14, wherein the phase rotation adjustment is based at least in part on two or more of the starting position of the symbol, the cyclic prefix length, or the sampling interval.

23. The method of claim 14, wherein the phase rotation adjustment is based at least in part on the starting position of the symbol, the cyclic prefix length, and the sampling interval.

24. A method for wireless communications at a user equipment (UE), comprising:
receiving, by the UE, an indication that a signal is to be transmitted by a network device at a first carrier frequency;
receiving, by the UE, the signal on a second carrier frequency that is different from the first carrier frequency; and
applying, by the UE, a phase rotation adjustment to the received signal based at least in part on receiving the signal on the second carrier frequency, the phase rotation adjustment corresponding to the first carrier frequency, and the phase rotation adjustment being based at least in part on a starting position of a symbol, a cyclic prefix length, a sampling interval, or any combination thereof.

25. The method of claim 24, the receiving comprising:
receiving the signal from the network device via a wireless repeater operating at the second carrier frequency.

26. The method of claim 24, further comprising:
identifying the phase rotation adjustment from a phase rotation adjustment table including a plurality of carrier frequencies that are different from the first carrier frequency, each carrier frequency of the plurality of carrier frequencies corresponding to a respective phase rotation adjustment.

27. The method of claim 24, the applying comprising:
applying the phase rotation adjustment to the signal prior to a transformation of the signal from a frequency-domain signal to a time-domain signal.

28. The method of claim 24, further comprising:
demodulating the signal; and
transforming the demodulated signal from a time-domain signal to a frequency-domain signal, wherein the phase rotation adjustment is applied after the transformation.

29. The method of claim 24, wherein the phase rotation adjustment is based at least in part on two or more of the starting position of the symbol, the cyclic prefix length, or the sampling interval.

30. The method of claim 24, wherein the phase rotation adjustment is based at least in part on the starting position of the symbol, the cyclic prefix length, and the sampling interval.

31. A method for wireless communications at a network device, comprising:
transmitting, by the network device, an indication to a user equipment (UE) that indicates a first carrier frequency for transmitting a signal;
receiving, from the UE, the signal on a second carrier frequency that is different from the first carrier frequency; and
applying, by the network device, a phase rotation adjustment to the signal based at least in part on receiving the signal on the second carrier frequency, the phase rotation adjustment corresponding to the second carrier frequency, and the phase rotation adjustment being based at least in part on a starting position of a symbol, a cyclic prefix length, a sampling interval, or any combination thereof.

32. The method of claim 31, wherein receiving the signal from the UE comprises:
receiving the signal from the UE via a wireless repeater operating at the second carrier frequency.

33. The method of claim 32, further comprising:
determining a configuration of the wireless repeater, wherein the phase rotation adjustment is based at least in part on the configuration of the wireless repeater.

34. The method of claim 33, wherein the configuration of the wireless repeater comprises a frequency translation from the first carrier frequency to the second carrier frequency, and wherein the phase rotation adjustment is applied based at least in part on the frequency translation.

35. The method of claim 31, further comprising:
identifying the phase rotation adjustment from a phase rotation adjustment table including a plurality of carrier frequencies that are different from the first carrier frequency, each carrier frequency of the plurality of carrier frequencies corresponding to a respective phase rotation adjustment.

36. The method of claim 31, further comprising:
demodulating the signal; and
transforming the demodulated signal from a time-domain signal to a frequency-domain signal, wherein the phase rotation adjustment is applied after the transformation.

37. The method of claim 31, wherein the phase rotation adjustment is based at least in part on two or more of the starting position of the symbol, the cyclic prefix length, or the sampling interval.

38. The method of claim 31, wherein the phase rotation adjustment is based at least in part on the starting position of the symbol, the cyclic prefix length, and the sampling interval.

39. An apparatus for wireless communications at a first device in a wireless network, comprising:
at least one processor; and
at least one memory coupled with the at least one processor, the at least one processor configured to:
transmit, by the first device, an indication to a second device that indicates a first carrier frequency to receive a signal;
apply, by the first device, a phase rotation adjustment to the signal based at least in part on the transmitted indication, the phase rotation adjustment corresponds to a second carrier frequency that is different from the first carrier frequency, and the phase rotation adjustment is based at least in part on a starting position of a symbol, a cyclic prefix length, a sampling interval, or any combination thereof; and
transmit, to the second device, the signal that comprises the applied phase rotation adjustment.

40. The apparatus of claim 39, further comprising:
at least one antenna, wherein the at least one processor is further configured to:
determine a configuration of a wireless repeater that is between the first device and the second device, wherein the phase rotation adjustment is based at least in part on the configuration of the wireless repeater.

41. The apparatus of claim 40, wherein:
the configuration of the wireless repeater comprises a frequency translation from the first carrier frequency to the second carrier frequency, and
the phase rotation adjustment is applied based at least in part on the frequency translation.

42. The apparatus of claim 39, wherein, to identify the phase rotation adjustment, the at least one processor is configured to:
select the phase rotation adjustment from one or more phase rotation adjustments for a plurality of carrier frequencies that are different from the first carrier frequency, each carrier frequency of the plurality of carrier frequencies corresponds to a respective phase rotation adjustment.

43. The apparatus of claim 39, wherein the phase rotation adjustment is based at least in part on two or more of the starting position of the symbol, the cyclic prefix length, or the sampling interval.

44. The apparatus of claim 39, wherein the phase rotation adjustment is based at least in part on the starting position of the symbol, the cyclic prefix length, and the sampling interval.

45. An apparatus for wireless communications at a first device in a wireless network, comprising:
at least one processor; and
at least one memory coupled with the at least one processor, the at least one processor configured to:
receive, from a second device, a configuration of a phase rotation;
receive, from the second device, a signal on a first carrier frequency;
apply a phase rotation adjustment to the signal based at least in part on the configuration, the phase rotation adjustment is based at least in part on a starting position of a symbol, a cyclic prefix length, a sampling interval, or any combination thereof; and
retransmit, to a third device, the signal that comprises the applied phase rotation adjustment, the signal retransmitted at a second carrier frequency.

46. The apparatus of claim 45, further comprising:
at least one antenna, wherein the at least one processor is further configured to:
apply the phase rotation adjustment to the signal based at least in part on respective indexes of one or more symbol periods, wherein the phase rotation adjustment applied to the signal received during the one or more symbol periods is calculated based at least in part on the respective indexes.

47. The apparatus of claim 45, wherein the at least one processor is further configured to:
identify the phase rotation adjustment from a phase rotation adjustment table that includes a plurality of carrier frequencies that are different from the first carrier frequency, each carrier frequency of the plurality of carrier frequencies corresponds to a respective phase rotation adjustment.

48. The apparatus of claim 45, wherein the at least one processor is further configured to:
apply the phase rotation adjustment to the signal prior to a transformation of the signal from a frequency-domain signal to a time-domain signal.

49. The apparatus of claim 45, wherein the phase rotation adjustment is based at least in part on two or more of the starting position of the symbol, the cyclic prefix length, or the sampling interval.

50. The apparatus of claim 45, wherein the phase rotation adjustment is based at least in part on the starting position of the symbol, the cyclic prefix length, and the sampling interval.

51. An apparatus for wireless communications at a user equipment (UE), comprising:
at least one processor; and
at least one memory coupled with the at least one processor, the at least one processor configured to:
receive, by the UE, an indication that a signal is to be transmitted by a network device at a first carrier frequency;
receive, by the UE, the signal on a second carrier frequency that is different from the first carrier frequency; and apply, by the UE, a phase rotation adjustment to the received signal based at least in part on the signal received on the second carrier frequency, the phase rotation adjustment corresponds to the first carrier frequency, wherein the phase rotation adjustment is based at least in part on a starting position of a symbol, a cyclic prefix length, a sampling interval, or any combination thereof.

52. The apparatus of claim 51, further comprising:
at least one antenna, wherein the at least one processor is further configured to:
receive the signal from the network device via a wireless repeater that operates at the second carrier frequency.

53. The apparatus of claim 51, wherein the at least one processor is further configured to:
identify the phase rotation adjustment from a phase rotation adjustment table that includes a plurality of carrier frequencies that are different from the first carrier frequency, each carrier frequency of the plurality of carrier frequencies corresponds to a respective phase rotation adjustment.

54. The apparatus of claim 51, wherein the at least one processor is further configured to:
apply the phase rotation adjustment to the signal prior to a transformation of the signal from a frequency-domain signal to a time-domain signal.

55. The apparatus of claim 51, wherein the phase rotation adjustment is based at least in part on two or more of the starting position of the symbol, the cyclic prefix length, or the sampling interval.

56. The apparatus of claim 51, wherein the phase rotation adjustment is based at least in part on the starting position of the symbol, the cyclic prefix length, and the sampling interval.

57. An apparatus for wireless communications at a network device, comprising:
at least one processor; and
at least one memory coupled with the at least one processor, the at least one processor configured to:
transmit, by the network device, an indication to a user equipment (UE) that indicates a first carrier frequency for transmission of a signal;
receive, from the UE, the signal on a second carrier frequency that is different from the first carrier frequency; and
apply, by the network device, a phase rotation adjustment to the signal based at least in part on the signal received on the second carrier frequency, the phase rotation adjustment corresponds to the second carrier frequency, and the phase rotation adjustment is based at least in part on a starting position of a symbol, a cyclic prefix length, a sampling interval, or any combination thereof.

58. The apparatus of claim 57, further comprising:
at least one antenna, wherein the at least one processor is further configured to:
receive the signal from the UE via a wireless repeater that operates at the second carrier frequency.

59. The apparatus of claim 58, wherein the at least one processor is further configured to:
determine a configuration of the wireless repeater, wherein the phase rotation adjustment is based at least in part on the configuration of the wireless repeater.

60. The apparatus of claim 59, wherein:
the configuration of the wireless repeater comprises a frequency translation from the first carrier frequency to the second carrier frequency, and
the phase rotation adjustment is applied based at least in part on the frequency translation.

61. The apparatus of claim 57, wherein the at least one processor is further configured to:
identify the phase rotation adjustment from a phase rotation adjustment table that includes a plurality of carrier frequencies that are different from the first carrier frequency, each carrier frequency of the plurality of carrier frequencies corresponds to a respective phase rotation adjustment.

62. The apparatus of claim 57, wherein the phase rotation adjustment is based at least in part on two or more of the starting position of the symbol, the cyclic prefix length, or the sampling interval.

63. The apparatus of claim 57, wherein the phase rotation adjustment is based at least in part on the starting position of the symbol, the cyclic prefix length, and the sampling interval.

64. A non-transitory computer-readable medium storing code for wireless communications at a first device in a wireless network, the code comprising instructions executable by a processor to:
transmit, by the first device, an indication to a second device that indicates a first carrier frequency for receiving a signal;
apply, by the first device, a phase rotation adjustment to the signal based at least in part on transmitting the indication, the phase rotation adjustment corresponding to a second carrier frequency that is different from the first carrier frequency, and the phase rotation adjustment being based at least in part on a starting position of a symbol, a cyclic prefix length, a sampling interval, or any combination thereof; and
transmit, to the second device, the signal comprising the applied phase rotation adjustment.

65. The non-transitory computer-readable medium of claim 64, wherein the instructions are further executable by the processor to:
determine a configuration of a wireless repeater that is between the first device and the second device, wherein the phase rotation adjustment is based at least in part on the configuration of the wireless repeater.

66. The non-transitory computer-readable medium of claim 65, wherein:
the configuration of the wireless repeater comprises a frequency translation from the first carrier frequency to the second carrier frequency, and
the phase rotation adjustment is applied based at least in part on the frequency translation.

67. The non-transitory computer-readable medium of claim 64, wherein the instructions to identify the phase rotation adjustment are executable by the processor to:
select the phase rotation adjustment from one or more phase rotation adjustments for a plurality of carrier frequencies that are different from the first carrier frequency, each carrier frequency of the plurality of carrier frequencies corresponding to a respective phase rotation adjustment.

68. A non-transitory computer-readable medium storing code for wireless communications at a first device in a wireless network, the code comprising instructions executable by a processor to:

receive, from a second device, a configuration of a phase rotation;

receive, from the second device, a signal on a first carrier frequency;

apply a phase rotation adjustment to the signal based at least in part on the configuration, the phase rotation adjustment being based at least in part on a starting position of a symbol, a cyclic prefix length, a sampling interval, or any combination thereof; and retransmit, to a third device, the signal comprising the applied phase rotation adjustment, the signal being retransmitted at a second carrier frequency.

69. The non-transitory computer-readable medium of claim 68, wherein the instructions to apply the phase rotation adjustment to the signal are executable by the processor to:

apply the phase rotation adjustment to the signal based at least in part on respective indexes of one or more symbol periods, wherein the phase rotation adjustment applied to the signal received during the one or more symbol periods is calculated based at least in part on the respective indexes.

70. The non-transitory computer-readable medium of claim 68, wherein the instructions are further executable by the processor to:

identify the phase rotation adjustment from a phase rotation adjustment table including a plurality of carrier frequencies that are different from the first carrier frequency, each carrier frequency of the plurality of carrier frequencies corresponding to a respective phase rotation adjustment.

71. The non-transitory computer-readable medium of claim 68, wherein the instructions to apply the phase rotation adjustment to the signal are executable by the processor to:

apply the phase rotation adjustment to the signal prior to a transformation of the signal from a frequency-domain signal to a time-domain signal.

72. A non-transitory computer-readable medium storing code for wireless communications at a user equipment (UE), the code comprising instructions executable by a processor to:

receive, by the UE, an indication that a signal is to be transmitted by a network device at a first carrier frequency;

receive, by the UE, the signal on a second carrier frequency that is different from the first carrier frequency; and apply, by the UE, a phase rotation adjustment to the received signal based at least in part on receiving the signal on the second carrier frequency, the phase rotation adjustment corresponding to the first carrier frequency, the phase rotation adjustment being based at least in part on a starting position of a symbol, a cyclic prefix length, a sampling interval, or any combination thereof.

73. The non-transitory computer-readable medium of claim 72, wherein the instructions to receive the signal from the network device are executable by the processor to:

receive the signal from the network device via a wireless repeater operating at the second carrier frequency.

74. The non-transitory computer-readable medium of claim 72, wherein the instructions are further executable by the processor to:

identify the phase rotation adjustment from a phase rotation adjustment table including a plurality of carrier frequencies that are different from the first carrier frequency, each carrier frequency of the plurality of carrier frequencies corresponding to a respective phase rotation adjustment.

75. The non-transitory computer-readable medium of claim 72, wherein the instructions to apply the phase rotation adjustment to the signal are executable by the processor to:

apply the phase rotation adjustment to the signal prior to a transformation of the signal from a frequency-domain signal to a time-domain signal.

76. A non-transitory computer-readable medium storing code for wireless communications at a network device, the code comprising instructions executable by a processor to:

transmit, by the network device, an indication to a user equipment (UE) that indicates a first carrier frequency for transmitting a signal;

receive, from the UE, the signal on a second carrier frequency that is different from the first carrier frequency; and apply, by the network device, a phase rotation adjustment to the signal based at least in part on receiving the signal on the second carrier frequency, the phase rotation adjustment corresponding to the second carrier frequency, the phase rotation adjustment being based at least in part on a starting position of a symbol, a cyclic prefix length, a sampling interval, or any combination thereof.

77. The non-transitory computer-readable medium of claim 76, wherein the instructions to receive the signal from the UE are executable by the processor to:

receive the signal from the UE via a wireless repeater operating at the second carrier frequency.

78. The non-transitory computer-readable medium of claim 77, wherein the instructions are further executable by the processor to:

determine a configuration of the wireless repeater, wherein the phase rotation adjustment is based at least in part on the configuration of the wireless repeater.

79. The non-transitory computer-readable medium of claim 78, wherein:

the configuration of the wireless repeater comprises a frequency translation from the first carrier frequency to the second carrier frequency, and the phase rotation adjustment is applied based at least in part on the frequency translation.

80. The non-transitory computer-readable medium of claim 76, wherein the instructions are further executable by the processor to:

identify the phase rotation adjustment from a phase rotation adjustment table including a plurality of carrier frequencies that are different from the first carrier frequency, each carrier frequency of the plurality of carrier frequencies corresponding to a respective phase rotation adjustment.

* * * * *